US009084947B2

(12) United States Patent
Price et al.

(10) Patent No.: US 9,084,947 B2
(45) Date of Patent: Jul. 21, 2015

(54) APPARATUS AND METHODS FOR CONVEYING A FLOW OF OIL-CONTAINING LIQUID INTO AN OIL SEPARATION SKIM TANK, AND SKIM TANKS INCLUDING THE SAME

(71) Applicants: Glenn Robert Price, Calgary (CA); Darwin Kiel, New Westminster (CA); Marvin Weiss, Calgary (CA); Chadwick Robert Larson, Vancouver (CA)

(72) Inventors: Glenn Robert Price, Calgary (CA); Darwin Kiel, New Westminster (CA); Marvin Weiss, Calgary (CA); Chadwick Robert Larson, Vancouver (CA)

(73) Assignee: FCCL Partnership, Calgary (CA)

( * ) Notice: Subject to any disclaimer, the term of this patent is extended or adjusted under 35 U.S.C. 154(b) by 199 days.

(21) Appl. No.: 13/651,193

(22) Filed: Oct. 12, 2012

(65) Prior Publication Data
US 2013/0153672 A1  Jun. 20, 2013

Related U.S. Application Data

(60) Provisional application No. 61/576,656, filed on Dec. 16, 2011.

(51) Int. Cl.
| | | |
|---|---|---|
| *B01D 17/025* | (2006.01) | |
| *B01D 17/02* | (2006.01) | |
| *B01D 21/24* | (2006.01) | |
| *B01D 17/00* | (2006.01) | |

(52) U.S. Cl.
CPC ............ *B01D 17/0208* (2013.01); *B01D 17/00* (2013.01); *B01D 21/2411* (2013.01); *B01D 21/2416* (2013.01); *B01D 21/2427* (2013.01)

(58) Field of Classification Search
CPC .......... B01D 17/0208; B01D 17/0214; B01D 21/0087; B01D 21/2411; B01D 21/2416; B01D 21/2427; B01D 21/2444
USPC .............. 210/800, 801, 519, 532.1, 538, 540; 239/597, 599
See application file for complete search history.

(56) References Cited

U.S. PATENT DOCUMENTS

| | | | | |
|---|---|---|---|---|
| 1,741,187 | A * | 12/1929 | Fuqua ........................... | 210/519 |
| 2,180,811 | A * | 11/1939 | King ............................. | 210/533 |
| 3,419,145 | A * | 12/1968 | De Celis ....................... | 210/519 |
| 4,038,186 | A * | 7/1977 | Potter et al. .................... | 210/519 |
| 4,406,789 | A * | 9/1983 | Brignon ........................ | 210/519 |
| 4,554,074 | A * | 11/1985 | Broughton .................... | 210/519 |
| 4,619,771 | A * | 10/1986 | Stall et al. ..................... | 210/519 |

(Continued)

OTHER PUBLICATIONS

Idelchik, I.E., Flow Resistance: A design guide for engineers (3rd Ed.) (Boca Raton: CRC Press, 1994), pp. 260, 262-264.

(Continued)

*Primary Examiner* — Christopher Upton
(74) *Attorney, Agent, or Firm* — Knobbe Martens Olson & Bear LLP

(57) ABSTRACT

Apparatus and methods for conveying a flow of oil-containing liquid into an oil separation skim tank, and a skim tank incorporating such apparatus and methods, are disclosed. One such apparatus includes at least one diffuser, the diffuser defining an intake opening configured to receive the flow of oil-containing liquid and an exhaust opening configured to convey the flow of oil-containing liquid into the skim tank. The diffuser is configured to cause the flow of oil-containing liquid to have a greater horizontal width at the exhaust opening than at the intake opening, while minimizing vertical divergence of the flow at the exhaust opening.

59 Claims, 9 Drawing Sheets

(56) References Cited

U.S. PATENT DOCUMENTS

| | | | | |
|---|---|---|---|---|
| 5,458,777 | A | * | 10/1995 | Khatib .......................... 210/519 |
| 6,537,458 | B1 | * | 3/2003 | Polderman .................... 210/801 |
| 7,479,231 | B2 | * | 1/2009 | Bernard ........................ 210/519 |
| 2008/0000846 | A1 | * | 1/2008 | Teichroeb et al. ............ 210/177 |

OTHER PUBLICATIONS

Miller, D.S., Internal Flow Systems (2nd Ed.) (Bedford: BHR Group, 1990), pp. 251-253.

* cited by examiner

APPARATUS AND METHODS FOR CONVEYING A FLOW OF OIL-CONTAINING LIQUID INTO AN OIL SEPARATION SKIM TANK, AND SKIM TANKS INCLUDING THE SAME

CROSS-REFERENCE TO RELATED APPLICATION

This application claims the benefit of priority from U.S. provisional patent application No. 61/576,656 filed Dec. 16, 2011, which is hereby incorporated herein by reference.

TECHNICAL FIELD

The present disclosure relates to oil separation, and more particularly to apparatus and methods for conveying a flow of oil-containing liquid into an oil separation skim tank, and skim tanks including such apparatus and methods.

BACKGROUND

De-oiling, to remove residual oil and solids from process water, is an important step in various methods for producing crude oil or bitumen.

For example, one such method is Steam-Assisted Gravity Drainage (SAGD), which can be used in the production of synthetic crude oil from bitumen in oil sands, such as the Athabasca oil sands in Alberta, Canada. Oil sands are typically deposits of loose sand or partially consolidated sandstone containing bitumen. Bitumen is a type of oil having high viscosity, typically high enough that the bitumen effectively behaves like a solid and does not flow at ambient conditions. However, SAGD is not limited to the production of synthetic crude oil from oil sands bitumen, and can also be used in the production of other types of highly viscous or heavy crude oil.

SAGD typically involves at least two wells drilled into an oil deposit at different depths. Steam is injected into the deposit through the upper well to heat the oil and thereby reduce its viscosity. Gravity then tends to cause the heated, less viscous oil to drain downward toward the wellbore of the lower well, along with condensed water from the cooling steam. The condensed water and oil are then pumped out from the lower well, along with some gases that are released during the process.

An initial production treatment phase then removes much of the oil, and exhausts a flow of "produced water" which still includes significant amounts of residual oil in the form of dispersed oil droplets, as well as suspended solids.

A de-oiling train then receives the flow of produced water. The role of the de-oiling train is to remove as much of the residual oil as possible from the produced water, not only to recover the value of the residual oil, but also to permit the produced water to be recycled for steam generation, in order to reduce the consumption rate of water required to carry out the SAGD process. Excess residual oil in the produced water can cause serious problems for steam generators and their associated water treatment components, including fouling of ion exchange resin in water softeners, and damage to tubes in the steam generators themselves. This in turn can lead to costly production shut-downs or reductions, often resulting in millions of dollars worth of lost production revenue, as well as significant maintenance and repair costs.

The de-oiling train typically includes (among other components) a skim tank, for primary separation of the residual oil and suspended solids from hot produced water. The de-oiling train may also include other secondary separation components.

A skim tank is effectively a very large gravity or buoyancy separation tank. Oil droplets have a lower density than water and tend to rise in water due to buoyancy whereas denser particles tend to settle, forming a layer at the bottom of the tank. The separated oil forms an oil layer at the top of the liquid which is removed using a skimmer and piped out. The separated water enters a separate outlet pipe near the bottom of the skim tank and is exhausted from the tank.

The terminal velocity of a small oil droplet, meaning the velocity at which it will rise in water due to buoyancy, is given by Stokes' Law:

$$V_t = g d^2 \Delta\rho / 18\mu$$

where:
  $V_t$=terminal velocity of the droplet
  d=diameter of the droplet
  g=gravitational acceleration,
  $\Delta\rho$=difference in density between the surrounding fluid and the oil droplet, and
  $\mu$=fluid viscosity.

Stokes' law is valid when the fluid that the droplets are rising through is characterized by laminar flow. More specifically, the Reynolds Number, which is a ratio between the inertial and viscous forces within a fluid and may be used to determine whether fluid flow is laminar or turbulent, should have a value less than 1:

$$Re = \rho_f V_t d / \mu < 1$$

where:
  Re=Reynolds Number, and
  $\rho_f$=the fluid density.

Since the velocity of the droplet depends on the diameter as well, having a small Reynolds Number requires that the diameter of the oil droplet be relatively small for Stokes' law to be valid.

The terminal velocity of small oil droplets rising in a skim tank tends to be very slow, on the order of centimeters per second. Moreover, since the terminal velocity of a rising oil droplet is proportional to the square of its diameter, this means that smaller oil droplets tend to rise at even slower terminal velocities than larger droplets.

In view of the low terminal velocities of oil droplets in a skim tank, SAGD skim tanks are typically large, often exceeding 45' in diameter and 50' in height, in order to reduce the mean fluid velocity in the tank for a given inflow rate and create a quiescent environment to allow small oil droplets to separate. To further reduce fluid velocity in the skim tank, conical diffusers are sometimes employed at the fluid inlets, to cause the oil-containing liquid to expand into a wider cross-sectional area and thereby decelerate to a lower velocity immediately before entering the tank. Although barriers such as mesh gratings can be used in other contexts to reduce fluid velocities, such barriers are not suitable for oil-containing liquid due to fouling concerns.

In addition, to reduce "short-circuiting," meaning the tendency of liquid to flow directly from the inlets to the exhaust without spending sufficient time in the tank to allow oil to separate, skim tanks often include a conical barrier or diverter near the bottom of the tank, with the top of the cone above the entrance to the exhaust pipe through which water exits, and the edges of the cone extending downward to near the outer perimeter of the tank. The conical diverter increases the minimum distance that liquid must travel between the inlet and exhaust, thereby increasing the minimum residence time of the liquid in the tank.

However, existing skim tanks are relatively inefficient, and their exhausted water often contains an undesirably large amount of residual oil. This not only represents lost oil production revenue, but can also lead to significant and costly downstream problems such as those mentioned above, including the fouling of ion exchange resins in water softeners and damage to steam generator tubes for example, which in turn can necessitate significant and costly production shutdowns for maintenance.

SUMMARY

The present inventors have investigated the flow characteristics inside a skim tank in general, including the effects on the flow characteristics caused by the inlet system. Generally, the present inventors have sought to improve the performance of a skim tank by increasing the residence time of liquid in the tank, and more particularly by improving upon the internal geometry to reduce either turbulent mixing or short-circuiting or both.

In this regard, the ideal residence time of liquid in an ideal skim tank would simply be the hydraulic retention time of the tank:

$$t_h = V/Q$$

where $t_h$=hydraulic retention time;
V=volume of the tank; and
Q=the volumetric inflow rate of liquid into the tank.

This ideal situation is characterized as "plug flow". In ideal plug flow conditions, a short-duration pulse of liquid entering the tank at time t=0 would exit the tank as a short-duration pulse of liquid at time $t=t_h$, and would thus have a residence time equal to the hydraulic retention time $t_h$. Likewise, the "breakthrough time," meaning the earliest time at which any of the pulse of liquid began to exit the tank, would also equal the hydraulic retention time $t_h$.

In practice, however, ideal plug flow is not achievable because non-slip wall conditions, non-uniform velocity distribution, turbulent mixing and short-circuiting tend to significantly decrease the actual residence time of liquid in the tank. In some types of real-world gravity separation skim tanks, a short-duration input pulse of liquid entering the skim tank may result in a long-duration exhaust pulse which can be represented graphically by a Residence Time Distribution (RTD) curve plotting the number of volumetric units of the input pulse which are reaching the exhaust at any given time. By way of example, for a particular type of skim tank, the RTD curve may begin (i.e. becomes non-zero) at an initial "breakthrough time" a short time after the initial pulse, when a first volumetric unit of the pulse reaches the exhaust. The RTD curve may then rise to a peak value a short time later when the largest number of volumetric units of the pulse are reaching the exhaust, and may then trail off as a diminishing number of volumetric units of the pulse reach the exhaust at progressively later residence times.

For example, the present inventors have found that even with conical diffusers and a cone shaped diverter, the initial breakthrough time for a conventional skim tank may be less than 10% of the hydraulic retention time, with the residence time distribution peak arriving as early as only 20% of the hydraulic retention time. This means that the flow patterns within such conventional skim tanks exhibit a high degree of turbulence and are closer to continuously stirred tank reactors than to ideal plug flow.

The present inventors have found that a significant level of circulation and turbulence in the skim tanks is caused by the intake system, notably including the jets through which the liquid enters the skim tank. They have found that existing conical diffusers at the inlets give rise to undesirable circulation and turbulence effects due to the vertically diverging velocity components that they add to the flow of liquid entering the skim tank. Since the liquid coming through a conical diffuser diverges in all forward directions, some of the liquid is directed upwards and some downwards. Vertically directed flow may aggravate the tendency to induce vertically oriented toroidal flow patterns within the liquid in the skim tank, which could cause mixing of the liquid and reduced residence time in the skim tank. Also, even apart from toroidal flow patterns and mixing, the vertically diverging velocities of the liquid emitted by the conical diffusers may also pose other problems. The downward velocity of liquid entering the tank from the lower portion of the cone may overwhelm the upward terminal velocity of smaller oil droplets, thus preventing them from being able to rise. Also, depending on the orientation and divergence angle of the conical diffusers and their proximity to the layer of oil forming at the top surface of the liquid in the skim tank, the upward velocity of liquid entering the tank from the upper portion of the cone may erode the oil layer, causing oil droplets that had already risen to the top to be mixed back into the tank.

In accordance with an illustrative embodiment, an apparatus for conveying a flow of oil-containing liquid into an oil separation skim tank includes at least one diffuser. The diffuser defines an intake opening configured to receive the flow of oil-containing liquid and an exhaust opening configured to convey the flow of oil-containing liquid into the skim tank. The diffuser is configured to cause the flow of oil-containing liquid to have a greater horizontal width at the exhaust opening than at the intake opening, while minimizing vertical divergence of the flow at the exhaust opening.

Such a diffuser is somewhat counter-intuitive: a conventional conical diffuser expands the cross-sectional area of the flow proportionally to the square of its expansion in width, whereas the diffuser of the illustrative embodiment described above expands the cross-sectional area of the flow only linearly with its expansion in width, with the result that one of ordinary skill in the art might intuitively expect greater velocity reduction and turbulence reduction with a conical diffuser. However, the present inventors have found that the diffuser of the illustrative embodiment described above advantageously achieves adequate velocity reduction with decreased turbulence and mixing, decreased downward velocities and increased residence times in comparison to conical diffusers, thereby tending to increase the efficiency of the tank in removing oil.

In accordance with another illustrative embodiment, an apparatus for conveying a flow of oil-containing liquid into an oil separation skim tank includes means for receiving the flow of oil-containing liquid and means for conveying the flow of oil-containing liquid into the skim tank. The means for conveying includes means for causing the flow of oil-containing liquid to have a greater horizontal width at the exhaust opening than at the intake opening, while minimizing vertical divergence of the flow at the exhaust opening.

In accordance with another illustrative embodiment, a method of conveying a flow of oil-containing liquid into a separation skim tank includes causing the flow of oil-containing liquid to have a greater horizontal width at an exhaust opening of a diffuser in fluid communication with the skim tank than at an intake opening of the diffuser, while minimizing vertical divergence of the flow at the exhaust opening.

In accordance with another illustrative embodiment, an apparatus for conveying a flow of oil-containing liquid into an oil separation skim tank includes a plurality of diffusers and a plurality of conduits. Each of the conduits is in fluid communication with an intake opening of a respective one of the plurality of diffusers. The apparatus also includes an intake manifold in fluid communication with the plurality of conduits. The intake manifold is configured to receive the flow of oil-containing liquid at an intake port thereof and to distribute the flow of oil-containing liquid from the intake manifold to the plurality of conduits. The intake manifold is configured to cause a pressure rise in the intake manifold across each of the plurality of conduits to be substantially less than a pressure drop from an intake opening of each conduit to an exhaust opening of its respective diffuser.

Advantageously, such an intake manifold tends to provide substantially equalized flow through the conduits. Increasing the pressure drop through each conduit and diffuser relative to the pressure rise in the intake manifold across each conduit tends to equalize the volumetric flow through the plurality of conduits. Equalized flow through the conduits, and ultimately through the diffusers, is beneficial as it results in a more uniform distribution of flow into the skim tank. This in turn tends to reduce the maximum velocity of liquid entering the tank from any one of the diffusers, thereby reducing turbulence and mixing, in comparison to non-equalized inflows which tend to promote faster flow rates through some diffusers than others.

In accordance with another illustrative embodiment, an apparatus for conveying a flow of oil-containing liquid into an oil separation skim tank includes means for receiving the flow of oil-containing liquid, and means for distributing the flow of oil-containing liquid to a plurality of conduits. Each of the conduits is in fluid communication with a respective one of a plurality of diffusers. The means for distributing includes means for causing a pressure rise in the means for distributing across each of the plurality of conduits to be substantially less than a pressure drop from an intake opening of each conduit to an exhaust opening of its respective diffuser.

In accordance with another illustrative embodiment, a method of conveying a flow of oil-containing liquid into an oil separation skim tank includes receiving the flow of oil-containing liquid at an intake port of an intake manifold in fluid communication with a plurality of conduits. Each of the conduits is in fluid communication with a respective intake opening of a respective one of a plurality of diffusers. The method also includes distributing the flow of oil-containing liquid from the intake manifold to the plurality of conduits. Distributing includes causing a pressure rise in the intake manifold across each of the plurality of conduits to be substantially less than a pressure drop from an intake opening of each conduit to an exhaust opening of its respective diffuser.

Other aspects and features of illustrative embodiments will become apparent to those ordinarily skilled in the art upon review of the following description of such embodiments in conjunction with the accompanying figures.

DETAILED DESCRIPTION

Figure 1:
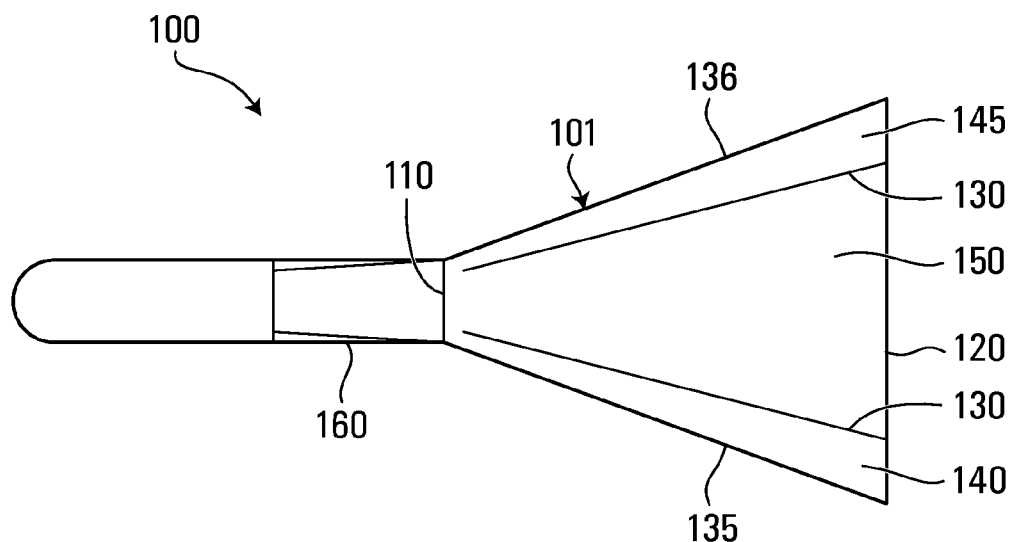
FIG. 1 is a top plan view of a diffusing apparatus for conveying a flow of oil-containing liquid into an oil separation skim tank, according to a first embodiment.
Figure 2:
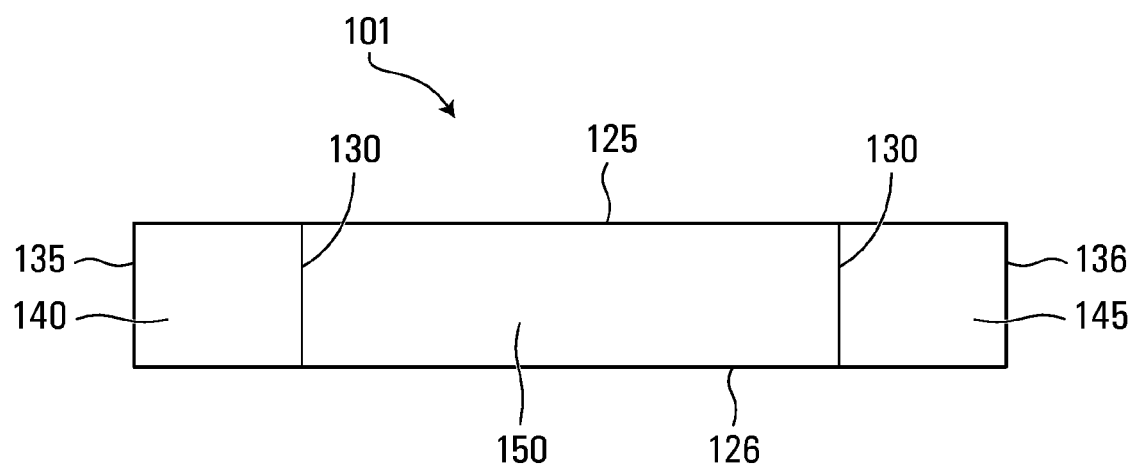
FIG. 2 is a front view of an exit plane of the apparatus of FIG. 1.

Referring to FIGS. 1 and 2, an apparatus according to a first embodiment is shown generally at 100. In this embodiment, the apparatus 100 includes at least one diffuser 101 for conveying a flow of oil-containing liquid into an oil separation skim tank. The at least one diffuser 101 defines an intake opening 110 configured to receive the flow of oil-containing liquid and an exhaust opening 120 configured to convey the flow of oil-containing liquid into the skim tank. In this embodiment, the diffuser 101 is configured to cause the flow of oil-containing liquid to have a greater horizontal width at the exhaust opening 120 than at the intake opening 110, while minimizing vertical divergence of the flow at the exhaust opening 120.

Skim Tank

Figure 3:
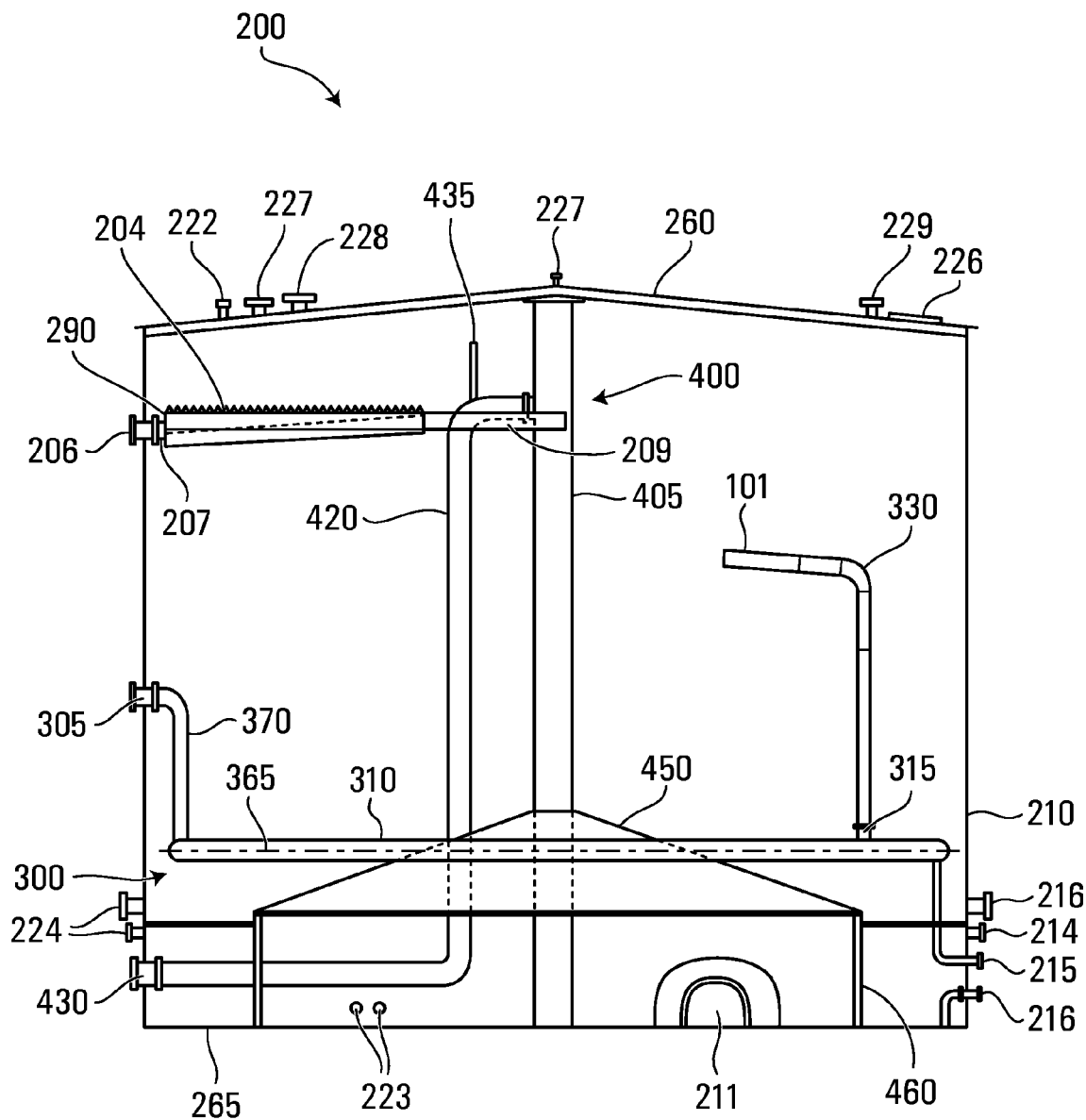
FIG. 3 is a side elevation view of a skim tank including the apparatus of FIG. 1, with a plurality of identical apparatuses and a cylindrical side wall of the skim tank omitted for ease of illustration.
Figure 4:
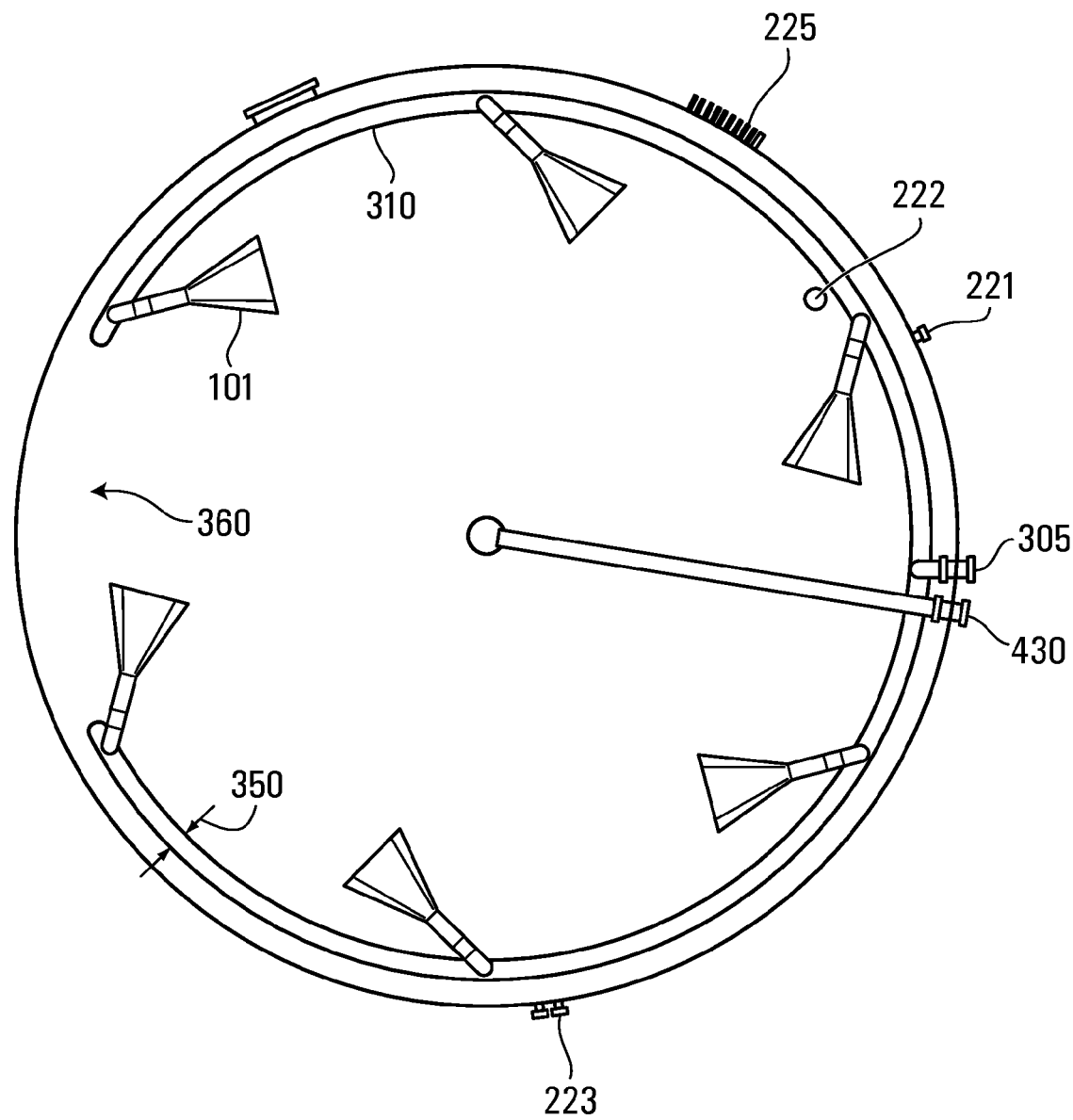
FIG. 4 is a top plan view of an intake manifold, a plurality of conduits and diffusers and an exhaust system of the skim tank of FIG. 3.
Figure 5:
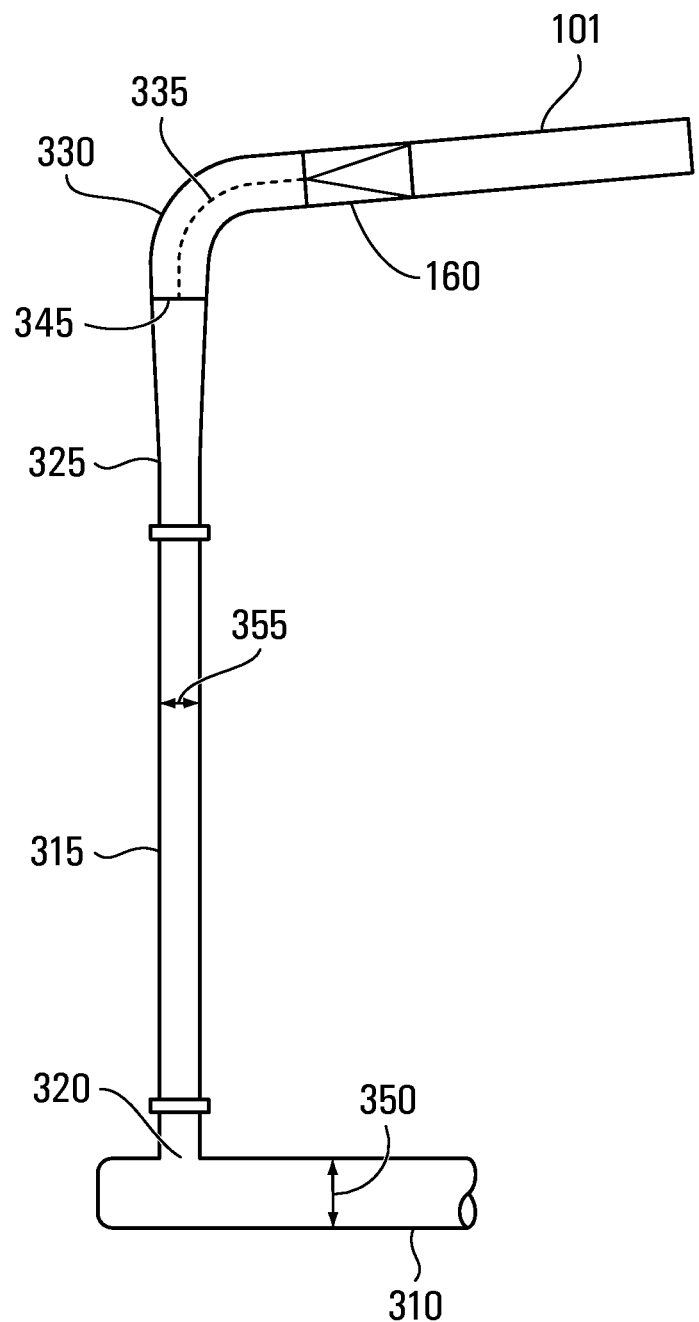
FIG. 5 is a side elevation view of a diffuser, a conduit and a portion of the intake manifold of the skim tank of FIG. 3.

Referring to FIGS. 3, 4 and 5, a skim tank according to an illustrative embodiment is shown generally at 200 in FIG. 3.

In this embodiment, the skim tank 200 includes the apparatus 100, in which an intake manifold 310, a plurality of conduits 315 and a plurality of respective diffusers 101 are configured to cause the flow of oil-containing liquid to flow into the skim tank 200 through the diffusers 101. (In FIG. 3, only a single conduit 315 and a single diffuser 101 are shown, for ease of illustration; FIG. 4 shows a plurality of diffusers 101.)

More particularly, in this embodiment the at least one diffuser 101 of the apparatus 100 includes the plurality of diffusers, and the apparatus 100 further includes the plurality of conduits 315. Each of the conduits 315 is in fluid communication with the intake opening 110 of a respective one of the plurality of diffusers 101. In this embodiment, the apparatus 100 further includes the intake manifold 310, which is in fluid communication with the plurality of conduits 315. In this embodiment, the intake manifold 310 is configured to receive the flow of oil-containing liquid at an intake port 305 thereof and to distribute the flow of oil-containing liquid from the intake manifold 310 to the plurality of conduits 315. More particularly still, in this embodiment the intake manifold 310 is advantageously configured to cause a pressure rise in the intake manifold 310 across each of the plurality of conduits 315 to be substantially less than a pressure drop from an intake opening 320 of each conduit 315 to the exhaust opening 120 of its respective diffuser 101, as discussed in greater detail below in connection with an intake system 300 of the skim tank.

In this embodiment, the oil of the oil-containing liquid is oil sands bitumen, dispersed in droplets of varying sizes throughout the liquid, and the skim tank is employed in a de-oiling train of a Steam-Assisted Gravity Drainage (SAGD) facility for the production of synthetic crude oil from the bitumen. Alternatively, the oil may include viscous oil other than oil sands bitumen. Likewise, the skim tank may be alternatively employed in facilities other than SAGD facilities.

In this embodiment, the skim tank 200 is a gravity separation vessel for oil separation and collection. The skim tank 200 receives the oil-containing liquid through the intake system 300, described in greater detail below. Once the oil-containing liquid is in the skim tank 200, oil droplets dispersed in the liquid, which is primarily water, tend to rise to the surface of the liquid due to buoyancy. The remaining liquid, including oil that has been unable to reach the top surface, exits the skim tank 200 through an exhaust system 400 described in greater detail below.

In this embodiment, the oil droplets that rise to the top surface form an oil layer at the top of the liquid. A skim box 204 collects oil from the oil layer, and removes the oil from the skim tank 200 through an oil exhaust port 206 extending through a cylindrical sidewall 210 of the skim tank 200.

In this embodiment, the liquid in the skim tank 200 has a slowly rotating flow pattern such that the oil at the top surface of the liquid impinges on the skim box 204, allowing the skim box 204 to collect the oil. In this embodiment, a first end 290 of the skim box 204 includes a skim box exhaust port 207 in fluid communication with the oil exhaust port 206 of the skim tank 200. In this embodiment, the skim box exhaust port 207 is bolted to the oil exhaust port 206 and sealed with a gasket. Alternatively, other suitable attachment means may be substituted. In this embodiment, the skim box 204 is supported by a pair of support channels 209, which in this embodiment are fastened to a first exhaust conduit 405 which extends vertically upward along a central axis of the skim tank 200. Thus, in this embodiment, the skim box 204 is fixed and does not move. Advantageously, the use of a fixed skim box results in a less costly skim box and lowered maintenance costs in comparison to "floating" skim boxes which can move, since a fixed skim box is mechanically simpler and avoids the structural weakening associated with constant flexing of the connections of floating skim boxes. Alternatively, however, in other embodiments the elevation of the skim box 204 may be floating or adjustable.

In this embodiment, the dimensions and other geometrical properties of the skim tank 200 are selected to enhance the efficiency of the skim tank in separating oil from the oil-containing liquid. In this regard, for a given volumetric flow rate of liquid into the skim tank, a larger volume of liquid in the tank tends to result in longer residence times of the liquid in the skim tank 200, which tends to increase the efficiency of oil separation and collection. The cross-sectional area across a horizontal plane of the skim tank 200 also impacts the rate of oil separation. A larger cross-sectional area creates the potential for the intake system to disperse the oil-containing liquid across a greater area as it enters the tank, which in turn allows for the velocities at which the oil-containing liquid flows into the skim tank 200 to be lowered. Lower intake velocities of the liquid entering the tank result in diminished turbulence and mixing, thereby tending to increase the efficiency of oil separation and collection.

In this embodiment, the skim tank 200 is a cylindrical tank with a diameter of about 57' and a sidewall height of about 48'. Alternatively, other suitable dimensions may be used.

In this embodiment, the skim tank 200 has a slightly sloped, conical roof 260 at its top end, and a floor 265 at its bottom end. Also in this embodiment, the roof 260, the floor 265 and the sidewall 210 include steel sheets welded together. Alternatively, other suitable materials and fabrication techniques may be used.

In this embodiment, the cylindrical sidewall 210 has a plurality of access points and ports for accessing the interior of the skim tank 200. More particularly, in this embodiment the sidewall 210 defines an oil exhaust port 206, an exhaust port 430 for the exhaust system 400, the intake port 305 for the intake system 300, a plurality of sealed doors 211, a plurality of truck-out connections 214-216 for removing accumulated solids or liquids from the tank and intake system, a plurality of stingers 221, a thermowell port 222, a plurality of level transmitter connection ports 223, a plurality of spare ports 224 sealed with blind flanges, and a plurality of sample extraction ports 225 at multiple elevations that allow samples to be extracted from the interior of the skim tank 200.

In this embodiment, the roof 260 of the skim tank 200 also defines a plurality of ports, including a manhole 226, gas vents 227 which allow for venting of gas and for modifying gas pressure, a pressure transmitter 228 and probe insertion ports 229 for insertion of probes.

Alternatively, the numbers and purposes of the ports defined by the sidewall 210 and the roof 260 may be varied as desired.

In this embodiment, the exterior of the skim tank 200 is clad in insulation and corrugated aluminum. Such insulation is preferable, due to the relatively high temperature of the hot oil-containing liquid entering the skim tank (which may be 90° C., for example). Alternatively, other suitable insulating or cladding materials may be used. Additionally, ladders, stairways and walkways (not shown) may be attached to the exterior of the skim tank 200 as desired.

Intake System

Referring to FIGS. 3, 4 and 5, the intake system is shown generally at 300. In this embodiment, the intake system 300 includes the intake manifold 310 configured to receive the flow of oil-containing liquid at the intake port 305 and to distribute the flow of oil-containing liquid from the intake manifold to the plurality of conduits 315. In this embodiment, the intake manifold 310 is also configured to cause a pressure rise in the intake manifold 310 across each of the plurality of conduits 315 to be substantially less than a pressure drop from the intake opening 320 of each conduit to the exhaust opening 120 of its respective diffuser.

Advantageously, such a pressure relationship tends to provide substantially equalized volumetric flow rates through the conduits. The ratio of pressure drop to pressure rise is proportional to the level of equalization of the volumetric flow through each of the plurality of conduits 315. Equalized flow through the conduits 315, and ultimately the diffusers 101, is beneficial as it results in a more uniform distribution of flow into the skim tank 200. This in turn tends to reduce the maximum velocity of liquid entering the tank from any one of the diffusers, thereby reducing turbulence and mixing, in comparison to non-equalized inflows which tend to involve significantly faster flow rates through some diffusers than others.

In this embodiment, the intake manifold 310 is configured to cause the pressure drop from the intake opening 320 of each conduit 315 to the exhaust opening 120 of its respective diffuser 101 to be at least five times greater than the pressure rise in the intake manifold 310 across each conduit 315.

More particularly, in this embodiment the intake manifold 310 is configured to cause the pressure drop to be at least eight times greater than the pressure rise. A pressure ratio of about 8 is expected to result in a deviation of about 5% from uniform, balanced flow.

More particularly still, in this embodiment the intake manifold 310 is configured to cause the pressure drop to be at least ten times greater than the pressure rise. Specifically, in the present embodiment, under typical operating conditions, the pressure rise in the intake manifold 310 across each conduit 315 is on the order of 0.1 kPa, while the pressure drop from the intake opening 320 of each conduit 315 to the exhaust opening 120 of its respective diffuser 101 is at least 1 kPa, such as a pressure drop of 1.5 kPa, for example.

In this embodiment, the configuration of the intake manifold 310 to achieve the desired ratio of pressure drop to pressure rise is accomplished by selecting appropriate dimensions of the intake manifold 310 relative to the dimensions of the conduits 315, taking into account the number of conduits and the resistance through each conduit and its corresponding diffuser. In this embodiment, in which the plurality of conduits 315 includes six conduits, an inner diameter 350 of the intake manifold 310 is at least twice as large as an inner diameter 355 of each of the conduits 315. More particularly, in this embodiment the inner diameter 350 of the intake manifold is at least 2¼ times as large as the inner diameter 355 of each of the conduits. More particularly still, in this embodiment the inner diameter 350 of the intake manifold 310 is 18" and the inner diameter 355 of each of the six conduits 315 is 8". Alternatively, the desired pressure relationship may be accomplished in other ways. Or as a further alternative, the desired pressure relationship may be omitted and substantially uniform flow can be achieved in other ways, such as individually controlled inlets, or pressure drop elements such as orifices in each conduit, for example. Or as a further alternative, less uniform flow rates may be tolerable for some applications.

As shown in FIG. 4, in this embodiment, the intake manifold 310 has a generally toroidal shape. More particularly, in this embodiment the shape of the intake manifold 310 is a toroid segment spanning less than 360° and the intake port 305 of the intake manifold 310 is diametrically opposite to a gap 360 in the intake manifold 310. Also in this embodiment, the intake system 300 includes six conduits 315 equally spaced around the circumference of the intake manifold 310, and the two conduits most distant from the intake port 305 are disposed at the ends of the intake manifold adjacent to the gap 360. The gap 360 in the intake manifold 310 advantageously avoids what would otherwise have been dead space in the intake manifold where suspended solids would have tended to accumulate if the intake manifold had extended through 360°. Alternatively, in other embodiments, the gap 360 may be omitted and an odd number of equally spaced conduits 315 may be provided with one of them diametrically opposite the intake port 305, for example.

In this embodiment, the intake manifold 310 has a radius of about 26' and an inner diameter of 18", and the gap 360 spans about 60°. Alternatively, the dimensions of the intake manifold may be varied, depending on factors such as the number of conduits 315, the configuration of and pressure drop through each conduit and its respective diffuser, the configuration of the skim tank, and the desired volumetric flow rate into the tank, for example.

In this embodiment, the intake manifold 310 is disposed inside the skim tank, and lies in a horizontal plane 365 disposed at an elevation of about 12' from the bottom of the skim tank 200, well below the height of the liquid in the skim tank 200, which in this embodiment is fixed at a height of about 42' to 43'. Alternatively, the intake manifold 310 may be positioned at other elevations, either inside or outside the skim tank 200.

In this embodiment, the intake manifold 310 and the conduits 315 are configured to cause the flow of oil-containing liquid to travel horizontally through the intake manifold 310 and to travel vertically into the conduits 315. Alternatively, the intake manifold 310 and the conduits 315 may be configured to cause the flow of oil-containing liquid to travel through the intake manifold 310 and into the conduits 315 in any suitable direction.

In this embodiment, each of the conduits 315 also acts as a diffuser to slow and expand the flow of oil containing fluid as it flows through the conduit to its respective diffuser 101. In this embodiment, each of the conduits 315 expands in cross-sectional area along at least a portion of its length 325. More particularly, in this embodiment, the expansion takes place along an upper portion of the conduit, as shown in FIG. 5. Alternatively, such expansion may take place elsewhere along the conduit or may be omitted.

In this embodiment, the expansion of each of the conduits 315 increases its cross-sectional area from an initial intake area to an outtake area almost equal to the area of the diffuser intake opening 110.

In this embodiment, each of the conduits 315 is in fluid communication with a respective one of a plurality of redirectors 330. Each of the redirectors 330 is configured to cause the flow of oil-containing liquid to transition from a substantially vertical flow direction through each of the conduits 315 to a substantially horizontal flow direction through each of the diffusers 101. More particularly, in this embodiment the substantially horizontal flow direction is in the range of 0° to 10° inclination above the horizontal plane. More particularly still, in this embodiment the substantially horizontal flow direction is inclined 5° above the horizontal plane. Alternatively, the substantially horizontal flow direction may be precisely horizontal, or may be inclined above the horizontal plane by different angle of less than 10°. In this regard, a downward flow angle is undesirable as the downward velocity of the flow may overwhelm the buoyancy of smaller oil droplets and cause them to sink rather than rise; conversely, a steep upward angle may tend to contribute to erosion of the oil layer at the top of the tank. Alternatively, redirectors may be omitted in some embodiments (for example, if the intake manifold is mounted outside the tank at the same height as the diffusers 101, such that the flow from the intake manifold 310 through the conduits 315 is already horizontal without the need for redirection).

In this embodiment, the plurality of redirectors 330 includes a plurality of joints, each of the joints being in fluid communication with a respective one of the conduits 315 and with a respective one of the diffusers 101. More particularly, in this embodiment, each of the joints is an elbow connector having an arc-shaped segment 335.

In this embodiment, for each one of the elbow connector redirectors 330, a ratio of a radius r of curvature of the arc-shaped segment 335 to an inner diameter d 345 of the elbow connector is in the range of $1.5 \leq (r/d) < 5$. More particularly, in this embodiment $r/d = 1.5$. In this regard, the ratio $r/d$ can affect the uniformity of the flow exiting each redirector 330. Although larger $r/d$ ratios are generally thought to provide more uniform flow coming out of an elbow connector, the present inventors have found that for the skim tank 200 configured as shown in FIG. 3, an r/d ratio of 1.5 provides more uniform flow than a ratio of 5. Alternatively, other suitable ratios may be used.

In this embodiment, immediately downstream of the arc-shaped segment 335, after being redirected in the substantially horizontal direction, each redirector 330 extends in the substantially horizontal direction along a length at least as great as an internal diameter of the redirector 330. In this regard, such a relative size relationship tends to improve the uniformity of the flow exiting the redirector.

In this embodiment, the conduits 315 and the redirectors 330 each have circular internal cross-sectional areas, while the intake opening 110 of each of the planar diffusers 101 is rectangular, or more particularly, square. Accordingly, in this embodiment, the intake system 300 of the apparatus 100 further includes a plurality of planar flow guides 160, each of which is in fluid communication with a respective one of the conduits 315 and with a respective one of the diffusers 101. Each of the planar flow guides 160 is configured to cause the flow of oil-containing liquid to transition from a circular cross-sectional flow through each one of the conduits 315 to a rectangular cross-sectional flow at the intake opening 110 of each of the diffusers 101. In this embodiment, each of the flow guides 160 is in fluid communication with its respective conduit 315 through a respective one of the redirectors 330. Alternatively, in embodiments where redirectors are omitted, the flow guides may be directly attached to the conduits 315.

In this embodiment, the diffusers 101 and the flow guides 160 are made of suitable types of steel and are joined by welding. Alternatively, other suitable materials and joining methods may be used.

Referring to FIGS. 1, 2 and 5, as discussed above, each diffuser 101 is configured to cause the flow of oil-containing liquid to have a greater horizontal width at its exhaust opening 120 than at its intake opening 110, while minimizing vertical divergence of the flow at the exhaust opening 120. More particularly, in this embodiment, each of the diffusers 101 includes a planar diffuser including spaced apart opposed top and bottom surfaces 125 and 126 substantially parallel to each other, and opposed first and second sides 135 and 136 which diverge outwardly from the intake opening 110 to the exhaust opening 120, such that in an operational orientation, the exhaust opening 120 has a vertical height substantially equal to a vertical height of the intake opening 110, and the exhaust opening 120 has a horizontal width greater than a horizontal width of the intake opening 110.

As discussed earlier herein, such a planar diffuser 101 tends to provide advantages over conventional conical diffusers. For example, minimizing the vertical divergence of the liquid flow at the exhaust opening 120 advantageously reduces turbulence and mixing caused by vertical velocity components of the flow. Vertical velocity components of the flow can lead to toroidal flow patterns and decreased residence times due to increased turbulence and mixing. By reducing or eliminating such flow patterns, the planar diffuser 101 may increase residence times and improve the oil separation efficiency of the skim tank.

Minimizing the vertical divergence of the flow at the exhaust opening also reduces the tendency of upwardly directed flows to erode the oil layer formed at the top surface of the liquid in the skim tank 200. Such erosion is undesirable as it can lead to remixing of oil with the liquid below.

A further advantage conferred by the planar diffuser 101 is that it reduces the amount of oil that enters the skim tank 200 with a vertically downward trajectory. Oil droplets with a vertically downward trajectory will have a longer distance to travel to reach the top surface and will have to rise through a stream directed downwards, which, depending on the size of the oil droplets, may prevent them from rising at all.

Thus, in the present embodiment, the opposed top and bottom surfaces 125 and 126 of the planar diffuser 101 are precisely parallel to each other, so that the vertical height of the exhaust opening 120 is precisely equal to the vertical height of the intake opening 110. In the present embodiment, therefore, the intent is that the flow of liquid through the exhaust opening 120 does not vertically diverge. In other embodiments, however, the top and bottom surfaces 125 and 126 may be substantially though not precisely parallel, to minimize but not eliminate vertical divergence; for example, one such alternative embodiment may involve a horizontal bottom surface 126 and a top surface 125 inclined by about 5° relative to the horizontal plane, so that the vertical height of the exhaust opening 120 is slightly larger than the vertical height of the intake opening 110.

While minimizing vertical divergence is beneficial, conversely, maximizing the horizontal divergence of the flow at the exhaust opening 120 is beneficial. Such horizontal divergence reduces the velocity of the oil-containing liquid as it enters the skim tank through the exhaust opening 120. Lower velocities, whether horizontal or vertical, tend to advantageously reduce turbulence and mixing in the skim tank 200. Moreover, spreading the oil-containing liquid over a greater area allows a greater portion of the available volume of the skim tank to be used, thereby further improving the efficiency of the separation process.

In the embodiment shown in FIGS. 1 and 2, the diffuser 101 is configured to cause the flow of oil-containing liquid to horizontally diverge while inhibiting separation of the flow from internal surfaces of the diffuser 101. Although horizontal divergence is beneficial, there are limits on the angle of divergence. If the divergence angle exceeds a critical value, flow separation will occur, whereby the flow becomes detached from the internal surfaces of the diffuser and then ceases to continue to follow or diverge with the internal surfaces of the diffuser.

Accordingly, in this embodiment, the diffuser 101 is configured to cause the flow of oil-containing liquid to horizontally diverge over an angular width less than a critical angle associated with separation of the flow from the internal surfaces of the diffuser 101.

Also in this embodiment, each diffuser 101 includes a plurality of vanes 130 configured to inhibit the separation of the flow from the internal surfaces of the diffuser by dividing the flow of oil-containing liquid into a plurality of diverging channels. Advantageously, the use of vanes tends to reduce the risk of flow separation within the diffuser 101.

More particularly, in this embodiment the plurality of vanes includes at least two vanes 130 configured to divide the flow into first and second outer channels 140 and 145 and at least one inner channel 150. In this embodiment, each of the first and second outer channels 140 and 145 has an angular width less than that of any channel of the at least one inner channel 150. More particularly, in this embodiment each diffuser 101 has precisely two vanes, thereby dividing the flow into the first and second outer channels 140 and 145 and precisely one inner channel 150. In this embodiment, each of the first and second outer channels 140 and 145 has an angular width less than half of that of the inner channel 150. More particularly, in this embodiment the first and second outer channels 140 and 145 each have an angular width less than one quarter of that of the inner channel 150. More particularly still, in this embodiment the inner channel 150 has an angular width of 28±5° and each of the first and second outer channels 140 and 145 has an angular width of 6±2°. More particularly still, in this embodiment the angular width of the inner channel 150 is 28° and the angular width of each of the first and second outer channels 140 and 145 is 6°. Advantageously, providing outer channels that are narrower than the inner channel tends to further reduce the risk of flow separation where it is normally highest, along the first and second sides 135 and 136. Moreover, although larger numbers of vanes and correspondingly smaller angular widths of the channels could further reduce the risk of flow separation, such a configuration would also increase the risk of fouling. Accordingly, the selection of two vanes defining three channels as described above tends to balance these competing concerns, by reducing the risk of flow separation without unduly increasing the risk of fouling.

In this embodiment, the diffuser 101 has a length of about 5' 4¼" and a width at the exhaust outlet of about 4' 10¼". Alternatively, the physical dimensions of the diffuser 101 may vary depending on various factors, such as the size of the skim tank 200 and the desired volumetric flow rate through the system, for example.

Generally, in addition to the dimensions and shape of the diffusers, the number, positions and orientations of the diffusers 101 all tend to affect the separation efficiency of the skim tank 200. In this regard, the flow of oil-containing liquid from any one of the one or more diffusers 101 into the skim tank 200 may interact with liquid flowing into the skim tank from any of the other diffusers 101, with structural features of the skim tank 200 such as the cylindrical sidewall 210, and with the oil layer at the top surface of the liquid in the skim tank 200. These interactions can create further turbulence and undesirable flow patterns.

In this embodiment, the vertical elevation of the diffusers 101 is selected to achieve a balance between short-circuiting and oil layer erosion. In this regard, increasing the height of the diffusers tends to advantageously reduce the tendency of the liquid to short-circuit (travel directly from the diffuser to the exhaust system 400), thereby increasing the residence time of the liquid, and also results in a lower travel distance that oil droplets must rise to reach the oil layer, thereby increasing the separation efficiency of the skim tank. However, placing the diffusers too high disadvantageously increases the risk that the flow of liquid from the diffusers may erode the oil layer, causing re-mixing of oil droplets that had already risen to the oil layer back down into the skim tank. Increasing the height may also increase the likelihood of gas vapor expression in the diffuser, which may interfere with flow. Balancing these considerations, in the present embodiment, in which the skim tank 200 has a diameter of about 57 feet and a height of about 50 feet, all of the diffusers 101 are at an elevation of about 32 feet above the bottom of the skim tank and about 10 feet below the top surface of the liquid layer in the tank. Alternatively, other elevations may be substituted.

In this embodiment, the inclination of each of the diffusers 101 above or below the horizontal plane is also selected in view of its potential impact on flow patterns and turbulence. Thus, in the present embodiment, each of the diffusers 101 is inclined between 0° and 5° above the horizontal plane, so that the flow of oil-containing liquid into the skim tank 200 ranges from horizontal to upwardly inclined by as much as 5°. More particularly, in this embodiment each of the diffusers 101 is inclined by precisely 5° above the horizontal plane. Advantageously, avoiding any downward velocity components in the flow entering the skim tank tends to reduce short-circuiting, and also reduces the likelihood that smaller oil droplets having commensurately smaller terminal velocities will be overwhelmed by the downward flow and carried downward rather than being permitted to rise upward. Conversely, in view of the depth of the diffusers 101, which in this embodiment is about ten feet below the top surface of the liquid in the skim tank 200, limiting the flow inclination from the diffusers to no more than 5° upwards minimizes the likelihood that the flow from the diffusers will erode the oil layer at the top of the liquid. As discussed previously, although imparting vertical components to the velocities of the oil-containing liquid as it enters the skim tank may tend to disadvantageously increase turbulence, this effect is reduced by the absence of downward velocities in the flow. Moreover, a slight upward inclination above the horizontal plane advantageously causes the oil droplets to have a slight upward velocity that will aid them in reaching the oil layer and reduce the likelihood of them being drawn down toward the bottom of the tank.

Alternatively, the diffusers 101 may be inclined at 0°, i.e., they may be precisely horizontal. Alternatively, other inclinations may be substituted.

With respect to the number and angular spacing of the diffusers 101, as noted earlier herein, in this embodiment the at least one diffuser includes a plurality of diffusers 101, or more particularly six diffusers 101, disposed at equal angles around a central axis of the skim tank 200. In comparison with a single diffuser or inlet, employing a plurality of diffusers 101 tends to permit greater deceleration of the flow to lower velocities as it enters the skim tank, thereby decreasing turbulence and mixing and increasing residence times of the liquid in the tank. Use of a plurality of evenly spaced diffusers also permits the flow to be spread more uniformly across a cross-sectional area of the skim tank, thereby making greater use of the volume of the tank and further increasing residence times. Alternatively, other numbers of diffusers 101 and other suitable spacings between the diffusers 101 may be substituted.

In this embodiment, the radial distance of the diffusers 101 from a central axis of the skim tank is selected to maximize the dispersion of oil-containing liquid across a horizontal cross-section of the skim tank 200, while striking a balance between minimizing interactions between the diffusers and the skim tank sidewall 210, and minimizing interactions among the diffusers themselves. More particularly, in the present embodiment, in which the skim tank 200 has a radius of about 28' 6" and the diffusers are angled inwards by 45° as shown in FIG. 4 and as discussed below, the diffusers 101 are positioned at equal distances around the circumference of a circle having a radius of about 26', corresponding to the radius of the intake manifold 310. This radial distance strikes a balance between minimizing the interaction between the sidewall 210 and the liquid flow from each diffuser 101, which favors a smaller radial distance from the central axis of the skim tank, and minimizing the interaction between the liquid flows of adjacent diffusers 101, which favors a larger radial distance. Generally, decreasing the radial distance between the central axis of the skim tank 200 and the diffusers 101 tends to reduce turbulence and short-circuiting caused by the flow from each diffuser colliding with the sidewall 210. However, if the radial distance of the diffusers 101 from the central axis of the skim tank 200 becomes too small, the diffusers 101 become too close to each other, which may result in turbulence and a stronger central downflow caused by interaction of the flows of liquid from adjacent diffusers with each other and in inefficient dispersion across the cross-sectional area of the skim tank 200.

In this embodiment, the orientation angle of each diffuser 101 about a vertical axis is also selected to reduce turbulence and mixing in the skim tank 200. Thus, in the present embodiment, as shown in FIG. 4, each diffuser 101 is oriented at a 45° angle, or more particularly, is oriented such that an angle between (a) a horizontal line segment from a vertical axis of the diffuser's respective conduit 315 to a center of the exhaust opening 120 of the diffuser, and (b) a horizontal line segment from the vertical axis of the conduit 315 to the central axis of the skim tank 200, is 45°. In this regard, pointing the diffusers 101 directly radially inward (0° angle) toward the center of the skim tank tends to cause the oil containing liquid flows from the different diffusers to interact with each other, thereby causing unwanted mixing, turbulence and a central downflow. Pointing each of the diffusers 101 in a direction parallel to a tangent of the cylindrical sidewall 210 closest to each respective diffuser 101 (90° angle) may reduce turbulence and central downflow but may also result in a flow pattern that rotates along the outer edge of the skim tank 200 and which tends to flow downward more strongly near the side walls, creating a central volume that participates minimally in separation of the oil. Angling the diffusers directly radially outward toward the sidewall 210 of the skim tank 200 (180° angle) may increase turbulence and short-circuiting caused by interaction of the flow from each diffuser 101 with the sidewall 210 and produce a very strong downflow near the tank walls. The 45° orientation of the present embodiment tends to provide sufficient dispersion of the oil-containing liquid, limited turbulence and limited localized downflow. Alternatively, other suitable orientations may be substituted.

Exhaust System

Referring to FIGS. 3, 4, 6 and 7, the exhaust system is shown generally at 400. In this embodiment, the exhaust system 400 is configured to maintain the volume of liquid in the skim tank 200 equal to a desired volume after a volume of liquid in the skim tank 200 has reached the desired volume.

Maintaining the volume of liquid in the skim tank 200 equal to a desired volume provides several advantages. One such advantage is that a fixed skim box 204 may be used, rather than a floating skim box that changes elevation as the liquid level in the skim tank 200 changes. The fixed skim box 204 may provide cost savings, including lower maintenance costs, as floating skim boxes are typically more mechanically complex and less durable due to repeated flexing of fluid connections. Additionally, a changing volume of liquid in the skim tank 200 may result in varying flow characteristics and greater turbulence, and the elevation changes of the top surface of the liquid may disturb the oil layer at the top surface and cause greater mixing of the separated oil with the underlying liquid. Maintaining the volume of liquid in the skim tank 200 at a desired level of volume leads to decreased turbulence and increased predictability of the flow characteristics within the skim tank 200.

In this embodiment, the volume of liquid in the skim tank 200 is maintained equal to a desired volume by configuring the exhaust system 400 to exhaust liquid from the skim tank 200 at a rate equal to a difference between a rate at which the flow of oil-containing liquid enters the skim tank 200 through the diffusers 101 and a rate at which oil is removed from the surface of the liquid in the skim tank by the skim box 204.

More particularly, in the present embodiment, the exhaust system 400 includes the first exhaust conduit 405, which includes an intake port 410 and an exhaust port 415. In this embodiment, the intake port 410 is disposed in a lower region of the skim tank 200 and is configured to admit liquid from the skim tank 200 into the first exhaust conduit 405. Also in this embodiment, the exhaust port 415 is disposed at a desired liquid level height corresponding to the desired volume of liquid in the skim tank 200. In this embodiment, the exhaust system 400 further includes a second exhaust conduit 420 having an intake port 425 and the exhaust port 430. In this embodiment, the intake port 425 of the second exhaust conduit 420 is in fluid communication with the exhaust port 415 of the first exhaust conduit 405 and is configured to allow liquid to flow from the exhaust port 415 of the first exhaust conduit 405 into the second exhaust conduit 420.

In this embodiment, the cross-sectional areas of the first exhaust conduit 405 and the second exhaust conduit 420 are sufficiently large to prevent a back-up of liquid in the system. More particularly in this embodiment, the first exhaust conduit 405 is a 30" diameter pipe and the second exhaust conduit is an 18" diameter pipe. Alternatively, other suitable dimensions may be used.

In this embodiment, the first exhaust conduit 405 includes a center column centered about the central axis of the skim tank 200. Alternatively, the first exhaust conduit may be disposed elsewhere in the skim tank.

In this embodiment, the desired liquid level height is about 42' to 43' and the first exhaust conduit 405 has a height of about 50'-51'. Alternatively, other suitable heights for the desired liquid level and the first exhaust conduit 405 may be substituted.

In this embodiment, to permit gravity drainage, the exhaust port 430 of the second exhaust conduit 420 has an elevation lower than the desired liquid level height. More particularly, in this embodiment, the exhaust port 430 is located near the bottom of the sidewall 210 of the skim tank 200. Alternatively, other suitable elevations may be used.

In this embodiment, the exhaust system 400 further includes a siphon breaker 435 configured to prevent the second exhaust conduit 420 from siphoning liquid from the first exhaust conduit 405. In this regard, without the siphon breaker 435, a malfunction downstream of the skim tank 200, such as a valve failing in an open position, could potentially result in almost all of the volume of the liquid in the skim tank 200 being siphoned out. As the skim tank 200 of the present embodiment holds roughly 3 million liters of hot oil-containing liquid, such inadvertent drainage is undesirable. In this embodiment, therefore, the siphon breaker 435 prevents the liquid in the skim tank 200 from draining below the height of the exhaust port 415 of the first exhaust conduit 405.

In this embodiment, the siphon breaker 435 includes a vent configured to vent the second exhaust conduit 420, and the vent is disposed at a height above the desired liquid level height. More particularly, in this embodiment, the siphon breaker 435 includes a pipe extending upward in the upper portion of the skim tank 200 and having an open upper end well above the desired liquid level. The height of the open end of the siphon breaker prevents any oil from the top surface of the liquid from entering the exhaust system 400 through the siphon breaker 435, in the event that the top surface of the liquid is not quiescent. Alternatively, other types and configurations of siphon breakers may be substituted.

In this embodiment, the intake port 410 of the first exhaust conduit 405 is configured to minimize a pressure differential between a pressure of the liquid inside the first exhaust conduit 405 and a pressure of the liquid outside the first exhaust conduit 405. Pressure equalization between the liquid inside and outside the first exhaust conduit 405 advantageously ensures that the liquid levels inside the first exhaust conduit 405 and in the skim tank 200 are equal, which in turn permits the exhaust system to accurately fix the height of the liquid in the skim tank at the height of the exhaust port 415 of the first exhaust conduit 405.

Figure 7:
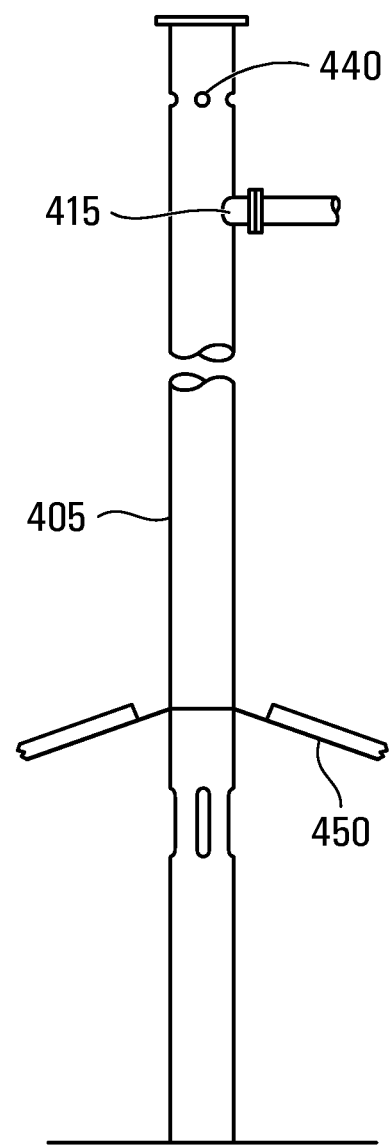
FIG. 7 is a partial side elevation view of a first exhaust conduit of the exhaust system of FIG. 6.

More particularly, in this embodiment the size and shape of the intake port 410 are configured to minimize the pressure differential between the liquid pressures inside and outside the first exhaust conduit 405. Generally, the larger the opening, the more suitable it may be for equalizing pressure. In this embodiment, the intake port 410 of the first exhaust conduit 405 includes a plurality of slots defined in the first exhaust conduit 405, as shown in FIG. 7. More particularly, in this embodiment the intake port 410 includes six vertical slots with rounded ends, equally spaced around the circumference of the first exhaust conduit 405. In this embodiment, each of the slots has a height of 1' 8" and a width of 4". Alternatively, other types, numbers and sizes of openings may be substituted.

In this embodiment, the first exhaust conduit 405 is also configured to minimize a pressure differential between the pressure of any gas at the top of the first exhaust conduit 405 and the pressure of gas above the liquid in the skim tank 200. More particularly, in this embodiment the first exhaust conduit 405 includes a plurality of vents 440 above the top surface of the liquid in the skim tank 200 which allow gas to be vented and gas pressure between gas in the first exhaust conduit 405 and the skim tank 200 to be equalized. More particularly still, in this embodiment the vents include four holes, each with a diameter of 6", equally spaced apart around a circumference of the first exhaust conduit 405. In this regard, gas may diffuse out of the liquid within the first exhaust conduit 405, rising to the top of the first exhaust conduit 405. A build-up of gas pressure in the first exhaust conduit 405 may result in a greater gas pressure in the first exhaust conduit 405 than in the skim tank 200. Such a pressure differential may result in the level of liquid in the first exhaust conduit 405 being lower than the level of liquid in the skim tank 200 and may limit the ability to keep the liquid level in the skim tank 200 at the desired liquid level. Advantageously, therefore, the vents 440 minimize this pressure differential thereby avoiding this problem. Alternatively, other suitable types and sizes of vents may be substituted.

In this embodiment, the exhaust system 400 further includes a diverter 450 configured to increase residence time of the liquid in the skim tank 200 by diverting the flow of liquid away from straight-line paths between the exhaust openings 120 of the diffusers 101 and the intake port 410 of the first exhaust conduit 405. Advantageously, such a diverter tends to reduce undesirable short-circuiting in the skim tank. In this regard, if a straight line path exists between the exhaust openings 120 of the diffusers 101 and the intake port 410 of the first exhaust conduit, short circuiting may occur whereby oil-containing liquid flows directly from any one of the diffusers 101 to the intake port 410. Short circuiting lowers the residence times of oil droplets in the skim tank 200, thereby diminishing the oil separation efficiency of the skim tank.

In this embodiment, the diverter 450 includes a frustoconical diverter, the first exhaust conduit 405 extends along a central axis of the frustoconical diverter, and the intake port 410 of the first exhaust conduit is disposed below a height at which the frustoconical diverter is sealed against an outer surface of the first exhaust conduit 405. Thus, the diverter 450 is interposed between the diffusers 101 and the intake port 410 of the first exhaust conduit 405, preventing any liquid from flowing in a straight-line path from a diffuser 101 to the intake port 410. Rather, liquid entering the skim tank from the diffusers must travel downward beneath the outer perimeter of the diverter 450, then travel upward and radially inward underneath the diverter 450 to reach the intake port 410.

In this embodiment, the diverter 450 is positioned so that the uppermost circular edge of the frustoconical diverter is sealed against the outer surface of the first exhaust conduit 405 at a height equal to about ⅓ of the desired liquid level height. Positioning the diverter 450 too high may decrease the useful effective volume of the skim tank 200 for the purposes of separation, since the volume under the diverter 450 is only minimally participating in the separation process. Alternatively, other suitable elevations may be used.

In this embodiment, the diverter 450 is sufficiently large to ensure that liquid in the skim tank 200 has to flow to the outer portions of the skim tank 200 before flowing underneath the diverter 450. More particularly, in this embodiment the diverter 450 has a radius of about 21' to 22'. Also in this embodiment, the bottom edge, i.e. the outer perimeter of the diverter, is high enough from the bottom of the skim tank 200 to ensure adequate flow underneath the diverter 450, even with a build-up of settled solid material on the floor of the skim tank 200. More particularly, in this embodiment the bottom of the diverter 450 is about 7' to 8' from the bottom of the skim tank 200. Alternatively, other suitable dimensions may be substituted.

In this embodiment, the diverter 450 is fabricated by joining together a plurality of triangular pieces of sheet metal to form an inverted cone. In this embodiment, the cone is supported by a plurality of support struts 460. Support channels may be attached to the outer surface of the cone. Alternatively, other suitable fabrication methods and other suitable support means may be substituted.

Figure 6:
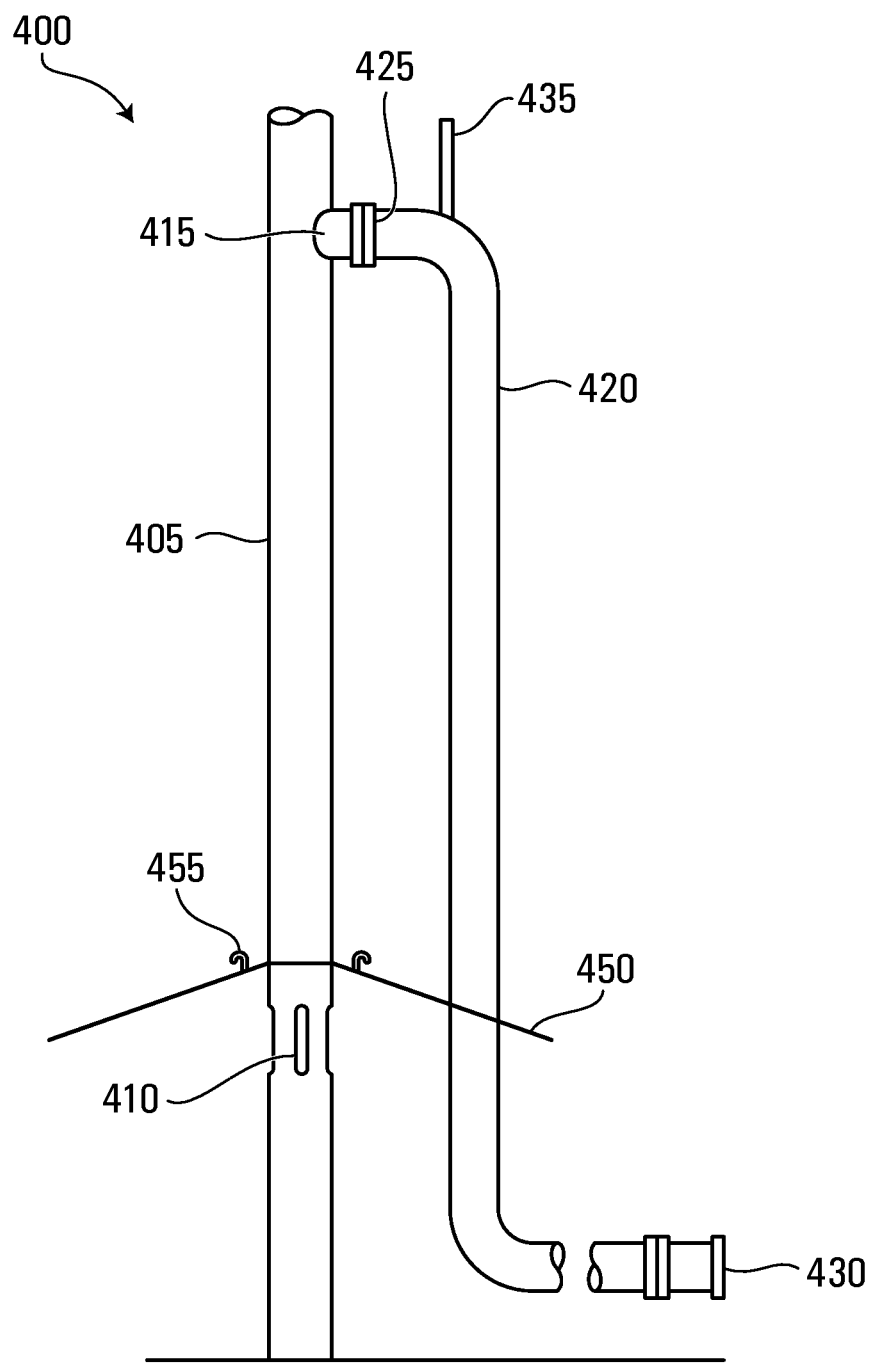
FIG. 6 is a partial side elevation view of the exhaust system of the skim tank of FIG. 3.

In this embodiment, the diverter 450 includes at least one vent 455 configured to vent accumulated gas and oil from the diverter 450. More particularly, in this embodiment the at least one vent 455 includes a pair of goose-neck vents as shown in FIG. 6, configured to vent accumulated gas and oil from underneath the diverter 450 to the liquid above the diverter 450. The shape of the vents 455 reduces the ability of oil-containing liquid from above the diverter to short-circuit downward through the vent, and also reduces the risk that suspended solids may clog the vent as they settle downward in the tank. In this embodiment, the cross-sectional area of each vent 455 is also relatively small, about 1" in diameter, which further reduces the risk and magnitude of downward short-circuiting of oil-containing liquid through the vent. Alternatively, other suitable sizes and types of vents may be used.

In this embodiment, the various components of the exhaust system discussed above are fabricated from steel. Alternatively, other suitable materials may be substituted.

Operation

In this embodiment, the skim tank 200 is a gravity separator for separating oil from oil-containing liquid, as described earlier herein.

In this embodiment, the skim tank 200 has a volume of approximately 3000 m$^3$ (3 million liters) when filled to the desired liquid level height, and a typical inflow rate of oil-containing liquid into the skim tank is about 500 m$^3$/h. Thus, in this embodiment the hydraulic retention time $t_h$, representing the ideal residence time of liquid in the skim tank under idealized perfect plug flow conditions, is about 6 hours.

Likewise, in this embodiment, the time required to initially fill the skim tank 200 to its desired liquid height at the typical liquid inflow rate is about 6 hours. To fill the skim tank 200, oil-containing liquid enters the intake system 300 through the intake port 305, at a rate of about 500 m$^3$/h. The oil-containing liquid travels through the intake conduit 370 and into the intake manifold 310. Due to the configuration of the intake manifold 310 discussed earlier herein, the oil-containing liquid travels from the intake manifold 310 through each of the six conduits 315, then through the respective redirector 330, flow guide 160 and diffuser 101 associated with each conduit 315, to generate six substantially equalized, uniform flows of oil-containing liquid from the exhaust openings 120 of the six diffusers 101 into the skim tank 200.

While the skim tank 200 is filling, prior to the liquid level in the skim tank reaching the height of the diffusers 101, the oil-containing liquid spills downward in the skim tank 200 and begins to fill the tank from the bottom up. As the liquid reaches the height of the intake port 410 of the first exhaust conduit 405, the liquid begins to fill the first exhaust conduit 405. As the liquid level in the skim tank rises above the height of the intake port 410, the configuration discussed above by which the intake port 410 minimizes the pressure differential between the liquid inside and outside the first exhaust conduit 405 ensures that the liquid level inside the first exhaust conduit 405 equals the liquid level in the skim tank 200.

Once the liquid level in the skim tank surpasses the height of the exhaust openings 120 of the diffusers 101, the configuration of each diffuser 101 discussed above causes the flow of oil-containing liquid to diverge horizontally but not vertically as it passes through the diffuser exhaust opening 120 into the skim tank, resulting in an exhaust jet that spreads horizontally. The configuration of the diffusers 101 and more generally of the intake system 300 reduces the velocity of the flow of oil-containing liquid by orders of magnitude, from roughly 1 m/s when entering the intake manifold 310 to a velocity on the order of centimeters per second when exiting the diffusers 101 at the diffuser exhaust openings 120. The reduced fluid velocity at the diffuser exhaust opening 120 results in lower turbulence in the skim tank 200 and greater oil separation.

Once the level of liquid in the skim tank 200 reaches the desired liquid level height, which is fixed by the height of the exhaust port 415 of the first exhaust conduit 405, liquid within the first exhaust conduit 405 begins to spill over into the intake port 425 of the second exhaust conduit 420 and exit from the skim tank 200 through the exhaust port 430. Thereafter, as described in greater detail earlier herein, the exhaust system 400 is configured to automatically maintain the liquid level in the skim tank at the desired level fixed by the height of the exhaust port 415. The siphon breaker 435 prevents the formation of a siphon which could lower the liquid height in the skim tank 200 below the desired liquid height by draining some of the volume of liquid from the skim tank 200.

As discussed earlier herein, the configuration, position and orientation of the diffusers 101 cause the flow of the oil-containing fluid from the diffusers 101 to create a generally uniform distribution of oil-containing liquid across a generally horizontal plane of the skim tank 200. The level of vertical divergence of the oil-containing liquid is generally limited by the planar diffusers 101, which are inclined 5° upward but which inhibit vertical divergence of the flow as it enters the skim tank.

In this embodiment, the angular and vertical velocity components of the flow result in the oil-containing liquid slowly swirling around the skim tank 200 while slowly flowing downwards towards the outer edges of the diverter 450. The slowly swirling flow pattern is preferable to certain other possible flow patterns, such as vertically directed toroidal flow that may result if the diffusers 101 are pointed more towards the center of the skim tank 200, since the slowly swirling flow pattern tends to cause less turbulence and mixing.

As the oil-containing flow slowly swirls around the skim tank 200 and down towards the outer edge of the diverter 450, oil will generally rise toward the top surface and heavier solid particles will generally sink to the bottom of the skim tank 200.

As the oil rises and forms a layer at the top surface of the liquid, it is collected by the skim box 204. The slowly swirling oil layer is skimmed by the skim box 204 and flows from the skim box 204 to the oil exhaust port 206.

In this embodiment, as the liquid gradually migrates downward in the skim tank, the liquid is diverted around the outer edges of the diverter 450 to reach the intake port 410 of the first exhaust conduit 405 beneath the diverter 450, thereby increasing the residence time of the liquid in the tank. Any oil and gas that separate out of the liquid beneath the diverter 450 may vent to the liquid above the diverter 450 through one or more of the vents 455.

Using the intake and exhaust systems 300 and 400 described earlier herein and shown in FIGS. 1-7, flow patterns within the skim tank 200 are improved in comparison to conventional skim tanks. The breakthrough time and residence times increase significantly, and turbulence and mixing decrease, thereby improving the oil separation efficiency of the skim tank.

Physical Modeling Results

A 1:5.82 scale physical model of the skim tank 200 was constructed to analyze the flow characteristics of different intake system configurations, including the configuration discussed above. The 1:5.82 scale was selected based on practical considerations and dimensional analysis to determine the most appropriate similitude of the physical model to the skim tank 200. Testing was conducted on the physical model using Residence Time Distribution (RTD) measurements of a single liquid phase at various flow rates to confirm the similitude of the system. Using a single phase provided a close approximation to the multiphase oil-containing liquid for the purposes of flow analysis since the additional oil phase is a small fraction of the total liquid and has little influence on the flow distribution. The results of the testing, including Reynolds number and Froude number analysis, indicated that the physical model exhibited good similitude with the skim tank 200.

Residence time distribution (RTD) data and flow patterns were first established for a baseline configuration. The baseline configuration included scale model versions of the various components of the exhaust system 400 and the intake system 300, other than the diffusers 101 and flow guides 160. Instead of the planar diffusers 101, the baseline configuration employed six conventional conical diffusers spaced equally around a circle of circumference of about 9 feet, with each conical diffuser pointed generally inwards, away from the physical model tank wall, and having an orientation of 25° from the centerline connecting the center of the respective conduit and the center of the physical model tank. The flow was monitored by injecting a pulse of sodium flourescein dye and illuminating the flow with a 488 nm laser. Illuminating sodium flourescein with 488 nm laser light causes it to emit light at 521 nm, allowing the flow characteristics to be measured quantitatively.

RTD data can be shown graphically as normalized concentration of the dye at the outlet versus normalized time. Using the baseline geometry showed a breakthrough time of 9%±1% of the hydraulic retention time and a normalized concentration peak (residence time distribution peak) at 23% of the hydraulic retention time. The tail of the RTD curve fit an exponential decay function, similar to that of a continuously stirred tank. A general swirl flow pattern was induced by the conical diffusers, causing the dye to swirl in an outer annular region of the physical model tank. This type of flow pattern does not fully involve all of the available volume in the separation process, resulting in shorter effective residence times of the liquid.

Tests were conducted with the conical diffusers at different orientations and elevations. However, these changes did not result in any significant changes to the breakthrough time or the shape of the RTD curve.

Replacing the conical diffusers with 1:5.82 scale physical models of the planar diffusers 101, each oriented at 45° from the centerline, resulted in a marked improvement in the flow characteristics. Flow velocities were reduced and a qualitative analysis showed that dye injected into the flow stream was distributed largely through the center region of the physical model tank, meaning that a greater volume of the tank was being effectively used than was being used in the baseline configuration. The breakthrough time was increased from 9% of the hydraulic retention time $t_h$ to 17% of $t_h$, and the peak residence time distribution was delayed from 23% of $t_h$ to roughly 32% of $t_h$.

Accordingly, these results showed that the use of the planar diffusers 101 resulted in flow characteristics more favorable for oil separation than the flow characteristics resulting from the use of conventional conical diffusers.

Field Testing

Figure 8:
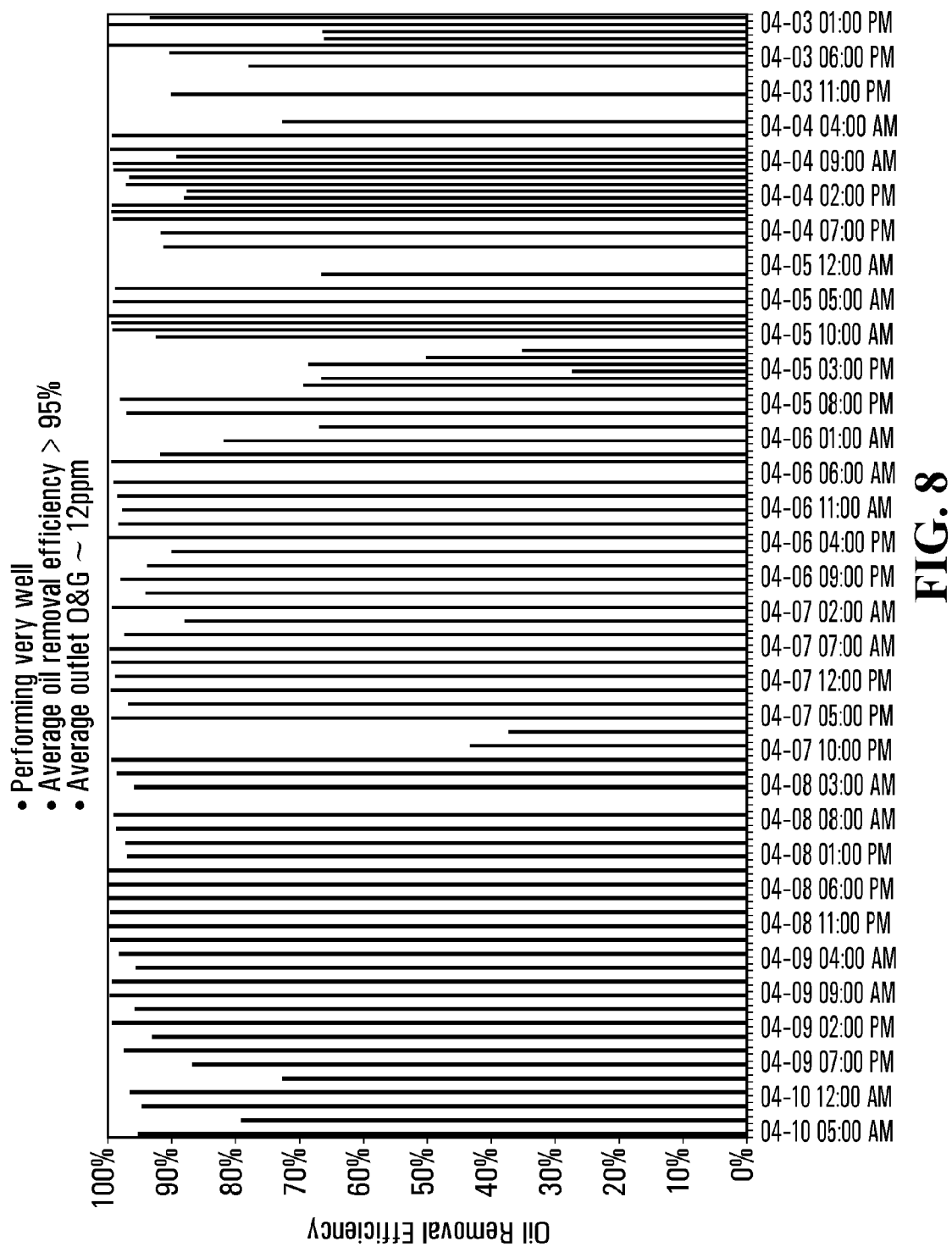
FIG. 8 is a plot of oil removal efficiency as a function of time from a skim tank as described herein.
Figure 9:
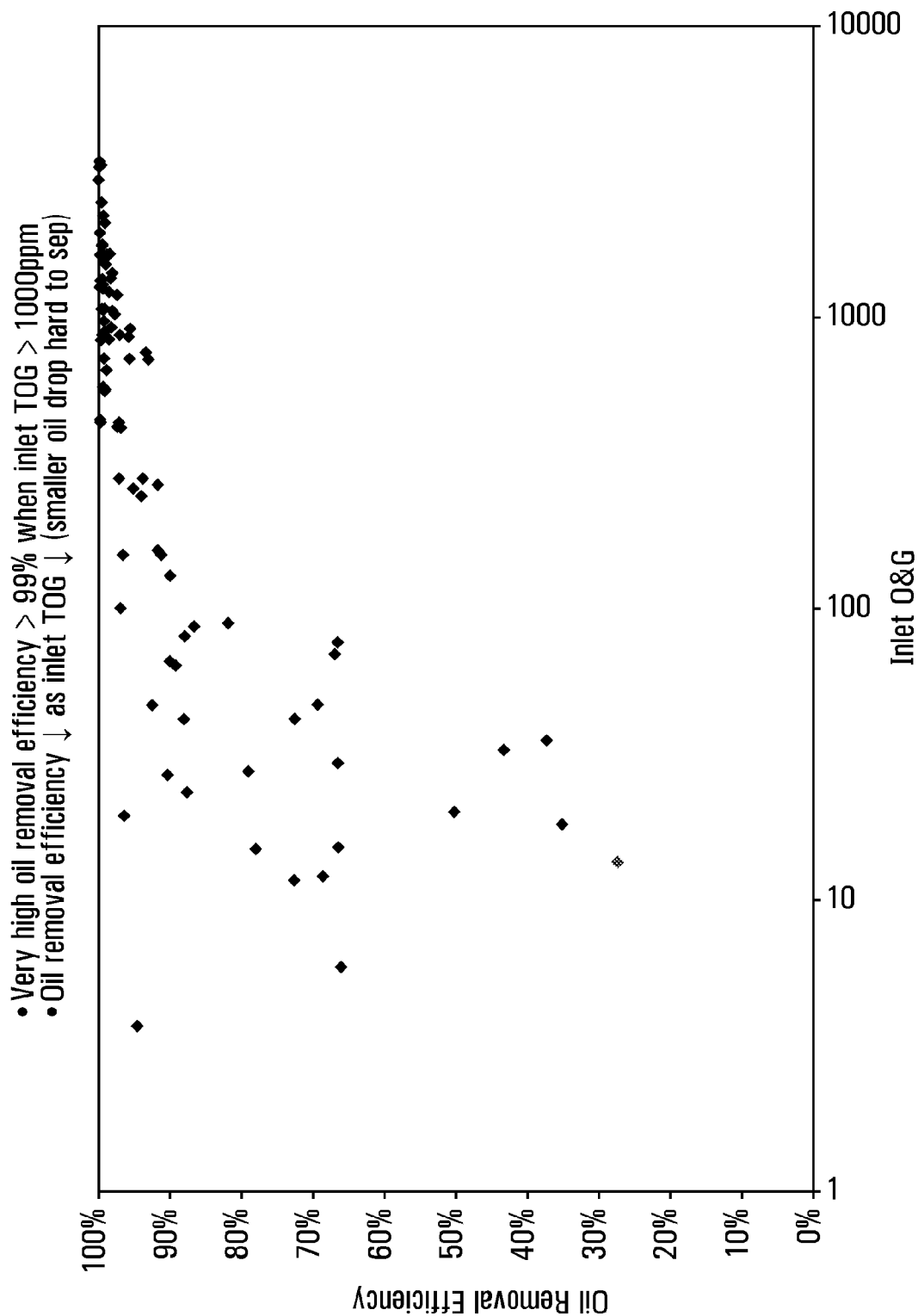
FIG. 9 is a plot of oil removal efficiency as a function of inlet total oil & grease from a skim tank as described herein.

A 3000 m$^3$ skim tank was constructed, measuring 57' in diameter by 47.6' in height, with six diffusers angled each at 45° to the circumference of the skim tank. To monitor the field operation of the skim tank, total oil & grease (O&G) measurements were taken at both the inlet and outlet of the skim tank every hour over a 7 day period. FIG. 8 is a plot of oil removal efficiency as a function of time and shows that over the 7-day trial period the skim tank performed successfully with an average oil removal efficiency of >95%, corresponding to an average O&G at the skim tank outlet of only about 12 ppm. FIG. 9 illustrates oil removal efficiency as a function of inlet O&G. Notably, a high oil removal efficiency of >99% was achieved when the inlet O&G was >1000 ppm. Oil removal efficiency was observed to decrease as inlet O&G decreased, indicating that smaller oil droplets are harder to separate, as expected.

Figure 10:
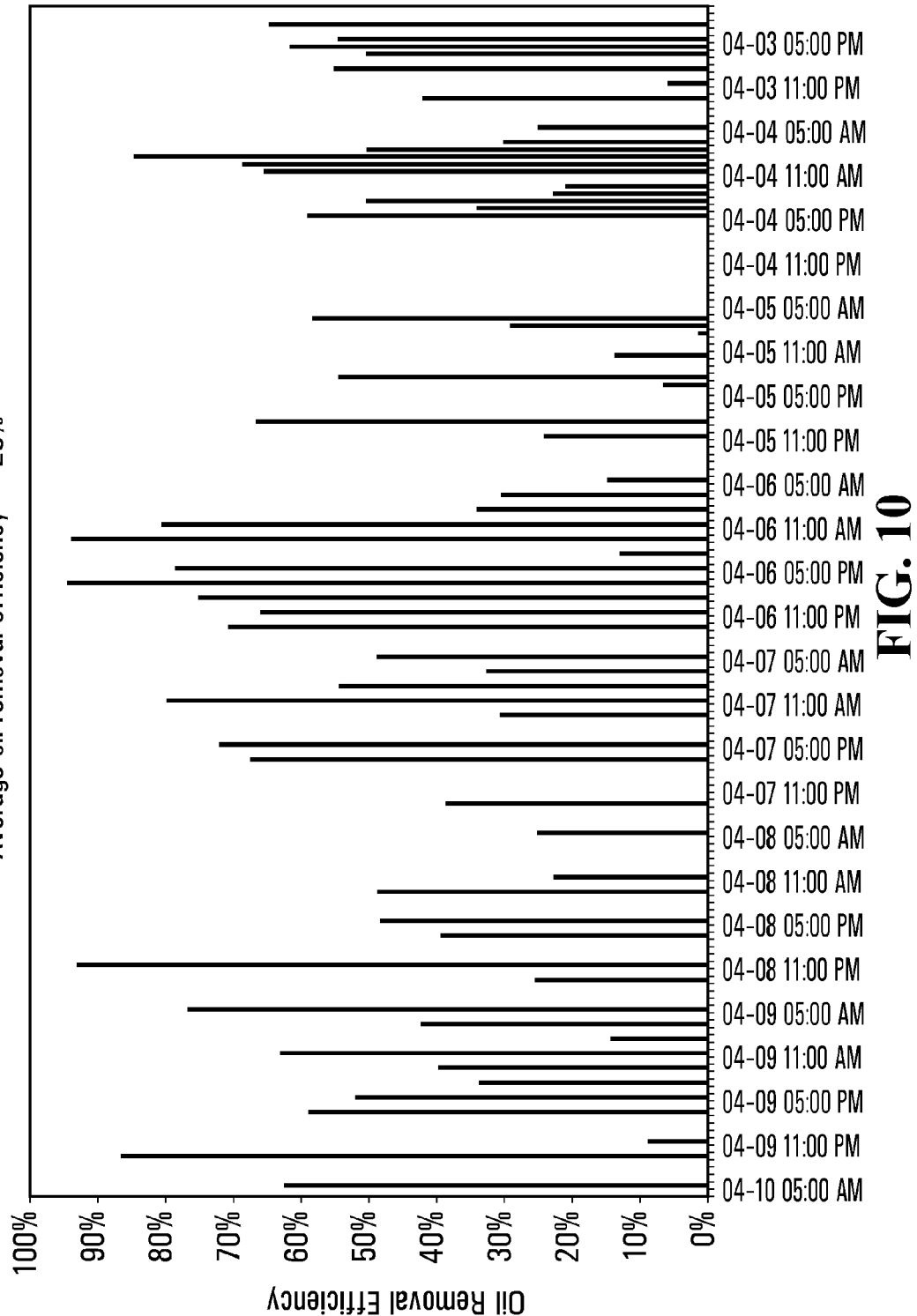
FIG. 10 is a plot of oil removal efficiency as a function of time from a conventional skim tank.

For comparison, poorer performance was observed from a conventional skim tank. FIG. 10 is a plot of oil removal efficiency as a function of time for a conventional skim tank and shows that over the 7-day trial period the conventional skim tank rarely achieved an oil removal efficiency of >70%, with the average oil removal efficiency being only 25%.

Alternatives

Although the above embodiments involve an entire skim tank 200, alternatively, another embodiment may consist mainly of a set of one or more of the diffusers 101, intended to be retrofitted to a conventional skim tank. In this regard, the present inventors have found that the diffusers themselves can achieve improvements over conventional diffusers such as conical diffusers, even apart from the other advantageous components of the intake system and exhaust system described herein. Such an alternative embodiment may further include the flow guides 160, if desired, to facilitate conversion of a circular cross-sectional flow in conventional pipes to a rectangular or square flow at the intake openings 110 of the diffusers 101.

Conversely, in another embodiment, the intake manifold 310 and conduits 315 may be provided without necessarily providing the diffusers 101, as the intake manifold and conduits can also improve flow uniformity and decrease turbulence even independently of the effects of the diffusers 101.

In another illustrative embodiment, the intake manifold 310 may be positioned outside the skim tank 200. In this embodiment, fluid flows from the intake manifold 310 through a plurality of conduits extending horizontally through a plurality of inlet ports (not shown) in the skim tank 200 before flowing into the plurality of diffusers 101. In such an embodiment, the redirectors 330 may be omitted. The intake manifold 310 may be located at any suitable elevation, including at the same elevation as the diffusers 101, for example, so that the flow of fluid from the intake manifold 310 to the diffusers 101 takes place in a single horizontal plane.

While specific embodiments have been described and illustrated, such embodiments should be considered illustrative only and not as limiting the invention as construed in accordance with the accompanying claims.

What is claimed is:

1. An apparatus for conveying a flow of oil-containing liquid into an oil separation skim tank, the apparatus comprising:
   at least one diffuser, the diffuser defining an intake opening configured to receive the flow of oil-containing liquid and an exhaust opening configured to convey the flow of oil-containing liquid into the skim tank;
   wherein the diffuser is configured to cause the flow of oil-containing liquid to have a greater horizontal width at the exhaust opening than at the intake opening, while minimizing vertical divergence of the flow at the exhaust opening; and
   wherein the diffuser comprises a planar diffuser comprising spaced apart opposed top and bottom surfaces substantially parallel to each other, and opposed first and second sides which diverge outwardly from the intake opening to the exhaust opening, such that in an operational orientation, the exhaust opening has a vertical height substantially equal to a vertical height of the intake opening, and the exhaust opening has a horizontal width greater than a horizontal width of the intake opening.

2. The apparatus of claim 1 wherein the diffuser is configured to cause the flow of oil-containing liquid to horizontally diverge while inhibiting separation of the flow from internal surfaces of the diffuser.

3. The apparatus of claim 2 wherein the diffuser is configured to cause the flow to horizontally diverge over an angular width less than a critical angle associated with separation of the flow from the internal surfaces of the diffuser.

4. The apparatus of claim 2 wherein the diffuser comprises a plurality of vanes configured to inhibit the separation of the flow from the internal surfaces of the diffuser by dividing the flow of oil-containing liquid into a plurality of diverging channels.

5. The apparatus of claim 4 wherein the plurality of vanes comprises at least two vanes configured to divide the flow into first and second outer channels and at least one inner channel.

6. An apparatus for conveying a flow of oil-containing liquid into an oil separation skim tank, the apparatus comprising:
   at least one diffuser, the diffuser defining an intake opening configured to receive the flow of oil-containing liquid and an exhaust opening configured to convey the flow of oil-containing liquid into the skim tank;
   wherein the diffuser is configured to cause the flow of oil-containing liquid to have a greater horizontal width at the exhaust opening than at the intake opening, while minimizing vertical divergence of the flow at the exhaust opening;
   wherein the diffuser is configured to cause the flow of oil-containing liquid to horizontally diverge while inhibiting separation of the flow from internal surfaces of the diffuser;
   wherein the diffuser comprises a plurality of vanes configured to inhibit the separation of the flow from the internal surfaces of the diffuser by dividing the flow of oil-containing liquid into a plurality of diverging channels;

wherein the plurality of vanes comprises at least two vanes configured to divide the flow into first and second outer channels and at least one inner channel; and wherein each of the first and second outer channels has an angular width less than that of any channel of the at least one inner channel.

7. The apparatus of claim 6 wherein the at least two vanes comprise two vanes, wherein the at least one inner channel comprises one inner channel and wherein each of the first and second outer channels has an angular width less than half of an angular width of the one inner channel.

8. The apparatus of claim 7 wherein each of the first and second outer channels has an angular width less than one-quarter of the angular width of the one inner channel.

9. The apparatus of claim 8 wherein the one inner channel has an angular width of 28±5° and each of the first and second outer channels has an angular width of 6±2°.

10. An apparatus for conveying a flow of oil-containing liquid into an oil separation skim tank, the apparatus comprising:

at least one diffuser, the diffuser defining an intake opening configured to receive the flow of oil-containing liquid and an exhaust opening configured to convey the flow of oil-containing liquid into the skim tank;

wherein the diffuser is configured to cause the flow of oil-containing liquid to have a greater horizontal width at the exhaust opening than at the intake opening, while minimizing vertical divergence of the flow at the exhaust opening; and wherein the at least one diffuser comprises a plurality of diffusers, and further comprising:

a plurality of conduits, each of the conduits in fluid communication with the intake opening of a respective one of the plurality of diffusers; and an intake manifold in fluid communication with the plurality of conduits, the intake manifold configured to receive the flow of oil-containing liquid at an intake port thereof and to distribute the flow of oil-containing liquid from the intake manifold to the plurality of conduits, wherein the intake manifold is configured to cause a pressure rise in the intake manifold across each of the plurality of conduits to be substantially less than a pressure drop from an intake opening of each conduit to the exhaust opening of its respective diffuser.

11. The apparatus of claim 10 wherein the intake manifold is configured to cause the pressure drop to be at least five times greater than the pressure rise.

12. The apparatus of claim 10 wherein the intake manifold is configured to cause the pressure drop to be at least eight times greater than the pressure rise.

13. The apparatus of claim 10 wherein the intake manifold is configured to cause the pressure drop to be at least ten times greater than the pressure rise.

14. The apparatus of claim 10 wherein an inner diameter of the intake manifold is at least twice as large as an inner diameter of each of the conduits.

15. The apparatus of claim 14 wherein the inner diameter of the intake manifold is at least 2¼ times as large as the inner diameter of each of the conduits.

16. The apparatus of claim 10 wherein a shape of the intake manifold is generally toroidal.

17. The apparatus of claim 16 wherein the shape of the intake manifold is a toroid segment spanning less than 360°.

18. The apparatus of claim 17 wherein the intake port of the intake manifold is diametrically opposite to a gap in the intake manifold.

19. The apparatus of claim 10 wherein the intake manifold and the conduits are configured to cause the flow of oil-containing liquid to travel horizontally through the intake manifold and to travel vertically into the conduits.

20. The apparatus of claim 19 further comprising a plurality of redirectors, each of the redirectors configured to cause the flow of oil-containing liquid to transition from a substantially vertical flow direction through each of the conduits to a substantially horizontal flow direction through each of the diffusers.

21. The apparatus of claim 20 wherein each of the redirectors is configured to cause the flow to transition from the substantially vertical flow direction to a direction in the range of 0° to 10° inclination above the horizontal plane.

22. The apparatus of claim 20 wherein the plurality of redirectors comprises a plurality of joints, each of the joints being in fluid communication with a respective one of the conduits and with a respective one of the diffusers.

23. The apparatus of claim 22 wherein each of the joints has an arc-shaped segment, wherein a ratio of a radius r of curvature of the arc-shaped segment to an inner diameter d of the elbow connector is in the range of $1.5 \leq (r/d) < 5$.

24. The apparatus of claim 20 further comprising a plurality of planar flow guides, each of the planar flow guides being in fluid communication with a respective one of the redirectors and with a respective one of the diffusers, each of the planar flow guides being configured to cause the flow of oil-containing liquid to transition from a circular cross-sectional flow through each of the redirectors to a rectangular cross-sectional flow at the intake opening of each of the diffusers.

25. The apparatus of claim 10 further comprising a plurality of planar flow guides, each of the planar flow guides being in fluid communication with a respective one of the conduits and with a respective one of the diffusers, each of the planar flow guides being configured to cause the flow of oil-containing liquid to transition from a circular cross-sectional flow through each of the conduits to a rectangular cross-sectional flow at the intake opening of each of the diffusers.

26. The apparatus of claim 10 further comprising the skim tank, and wherein the intake manifold, the conduits and the diffusers are configured to cause the flow of oil-containing liquid to flow into the skim tank through the diffusers.

27. The apparatus of claim 26 further comprising a skimmer configured to remove oil from a surface of the liquid in the skim tank.

28. The apparatus of claim 27 further comprising an exhaust system wherein, after a volume of liquid in the skim tank has reached a desired volume, the exhaust system is configured to maintain the volume of liquid in the skim tank equal to the desired volume.

29. The apparatus of claim 28 wherein the exhaust system is configured to exhaust liquid from the skim tank at a rate equal to a difference between a rate at which the flow of oil-containing liquid enters the skim tank through the diffusers and a rate at which oil is removed from the surface of the liquid in the skim tank.

30. The apparatus of claim 28 wherein the exhaust system comprises:

a first exhaust conduit having an intake port and an exhaust port, wherein the intake port is disposed in a lower region of the skim tank and is configured to admit liquid from the skim tank into the first exhaust conduit, and wherein the exhaust port is disposed at a desired liquid level height corresponding to the desired volume of liquid in the skim tank;

a second exhaust conduit having an intake port and an exhaust port, wherein the intake port of the second exhaust conduit is in fluid communication with the exhaust port of the first exhaust conduit and is configured to allow liquid to flow from the exhaust port of the first exhaust conduit into the second exhaust conduit; and a siphon breaker configured to prevent the second exhaust conduit from siphoning liquid from the first exhaust conduit.

31. The apparatus of claim 30 wherein the intake port of the first exhaust conduit is configured to minimize a pressure differential between a pressure of the liquid inside the first exhaust conduit and a pressure of the liquid outside the first exhaust conduit.

32. The apparatus of claim 31 wherein the intake port of the first exhaust conduit comprises a plurality of slots defined in the first exhaust conduit.

33. The apparatus of claim 30 wherein the siphon breaker comprises a vent configured to vent the second exhaust conduit, wherein the vent is disposed at a height above the desired liquid level height.

34. The apparatus of claim 30 further comprising a diverter configured to increase residence time of the liquid in the tank by diverting the liquid away from straight-line paths between the exhaust openings of the diffusers and the intake port of the first exhaust conduit.

35. The apparatus of claim 34 wherein the diverter comprises a frustoconical diverter, wherein the first exhaust conduit extends along a central axis of the frustoconical diverter, and wherein the intake port of the first exhaust conduit is disposed below a height at which the frustoconical diverter is sealed against an outer surface of the first exhaust conduit.

36. The apparatus of claim 34 wherein the diverter comprises at least one vent configured to vent accumulated gas and oil from the diverter.

37. An apparatus for conveying a flow of oil-containing liquid into an oil separation skim tank, the apparatus comprising:

means for receiving the flow of oil-containing liquid; and
means for conveying the flow of oil-containing liquid into the skim tank;
wherein the means for conveying comprises means for causing the flow of oil-containing liquid to have a greater horizontal width at the means for conveying than at the means for receiving, and wherein the apparatus comprises means for minimizing vertical divergence of the flow at the means for conveying; and
wherein the apparatus comprises a planar diffuser comprising spaced apart opposed top and bottom surfaces substantially parallel to each other, and opposed first and second sides which diverge outwardly from the means for receiving to the means for conveying, such that in an operational orientation, the means for conveying has a vertical height substantially equal to a vertical height of the means for receiving, and the means for conveying has a horizontal width greater than a horizontal width of the means for receiving.

38. A method of conveying a flow of oil-containing liquid into a separation skim tank, the method comprising:

causing the flow of oil-containing liquid to have a greater horizontal width at an exhaust opening of a diffuser in fluid communication with the skim tank than at an intake opening of the diffuser, while minimizing vertical divergence of the flow at the exhaust opening;
wherein causing the flow to have a greater horizontal width at the exhaust opening comprises causing the flow to horizontally diverge while inhibiting separation of the flow from internal surfaces of the diffuser;
wherein inhibiting separation comprises dividing the flow into a plurality of diverging channels; and
wherein dividing comprises dividing the flow into first and second outer channels and at least one inner channel, and wherein each of the first and second outer channels has an angular width less than that of any channel of the at least one inner channel.

39. The method of claim 38 wherein causing the flow to horizontally diverge while inhibiting separation of the flow comprises causing the flow to horizontally diverge over an angular width less than a critical angle associated with separation of the flow from the internal surfaces of the diffuser.

40. A method of conveying a flow of oil-containing liquid into a separation skim tank, the method comprising:

causing the flow of oil-containing liquid to have a greater horizontal width at an exhaust opening of a diffuser in fluid communication with the skim tank than at an intake opening of the diffuser, while minimizing vertical divergence of the flow at the exhaust opening;
wherein causing comprises causing the flow of oil-containing liquid to have a greater horizontal width at each of a plurality of exhaust openings of a plurality of respective diffusers in fluid communication with the skim tank than at each of a plurality of respective intake openings of the diffusers, while minimizing vertical divergence of the flow at the exhaust openings, and further comprising:
receiving the flow of oil-containing liquid at an intake port of an intake manifold in fluid communication with a plurality of conduits, each of the conduits in fluid communication with a respective one of the intake openings of a respective one of the plurality of diffusers; and
distributing the flow of oil-containing liquid from the intake manifold to the plurality of conduits, wherein distributing comprises causing a pressure rise in the intake manifold across each of the plurality of conduits to be substantially less than a pressure drop from an intake opening of each conduit to the exhaust opening of its respective diffuser.

41. The method of claim 40 wherein causing the pressure rise to be substantially less than the pressure drop comprises causing the pressure drop to be at least five times greater than the pressure rise.

42. The method of claim 40 wherein causing the pressure rise to be substantially less than the pressure drop comprises causing the pressure drop to be at least eight times greater than the pressure rise.

43. The method of claim 40 wherein causing the pressure rise to be substantially less than the pressure drop comprises causing the pressure drop to be at least ten times greater than the pressure rise.

44. The method of claim 40 wherein causing the pressure rise to be substantially less than the pressure drop comprises causing a diameter of the flow in the intake manifold to be at least twice as large as a diameter of the flow in each of the conduits.

45. The method of claim 40 wherein causing the pressure rise to be substantially less than the pressure drop comprises causing a diameter of the flow in the intake manifold to be at least 2¼ times as large as a diameter of the flow in each of the conduits.

46. The method of claim 40 wherein causing the flow of oil-containing liquid to flow through the intake manifold into the plurality of conduits comprises causing the flow of oil-containing liquid to travel horizontally through the intake manifold and to travel vertically into the conduits.

47. The method of claim 46 further comprising causing the flow of oil-containing liquid to transition from a substantially vertical flow direction through each of the conduits to a substantially horizontal flow direction through each of the diffusers.

48. The method of claim 47 wherein causing the flow to transition from the substantially vertical flow direction to the substantially horizontal flow direction comprises causing the flow to transition to a direction in the range of 0° to 10° inclination above the horizontal plane.

49. The method of claim 47 wherein causing the flow to transition from the substantially vertical flow direction to the substantially horizontal flow direction comprises causing the flow of oil-containing liquid to travel through an elbow connector having an arc-shaped segment, wherein a ratio of a radius r of curvature of the arc-shaped segment to an inner diameter d of the elbow connector is in the range of $1.5 < (r/d) < 5$.

50. The method of claim 47 further comprising causing the flow of oil-containing liquid to transition from a circular cross-sectional flow through each of the conduits to a rectangular cross-sectional flow at the intake opening of each of the diffusers.

51. The method of claim 40 wherein distributing comprises causing the flow of oil-containing liquid to flow into the skim tank through the diffusers.

52. The method of claim 51 further comprising removing oil from a surface of the liquid in the skim tank.

53. The method of claim 52 further comprising, after a volume of liquid in the skim tank has reached a desired volume, maintaining the volume of liquid in the skim tank equal to the desired volume.

54. The method of claim 53 wherein maintaining comprises exhausting liquid from the skim tank at a rate equal to a difference between a rate at which the flow of oil-containing liquid enters the skim tank through the diffusers and a rate at which oil is removed from the surface of the liquid in the skim tank.

55. The method of claim 54 wherein exhausting comprises:
admitting liquid from the skim tank into an intake port of a first exhaust conduit, the intake port of the first exhaust conduit being disposed in a lower region of the skim tank;
allowing the liquid to flow from an exhaust port of the first exhaust conduit into an intake port of a second exhaust conduit, the exhaust port of the first exhaust conduit being disposed at a desired liquid level height corresponding to the desired volume of liquid in the skim tank; and
preventing the second exhaust conduit from siphoning liquid from the first exhaust conduit.

56. The method of claim 55 wherein admitting liquid from the skim tank into the intake port of the first exhaust conduit comprises minimizing a pressure differential between a pressure of the liquid inside the first exhaust conduit and a pressure of the liquid outside the first exhaust conduit.

57. The method of claim 55 wherein preventing comprises venting the second exhaust conduit at a height above the desired liquid level height.

58. The method of claim 55 wherein admitting liquid from the skim tank into the intake port of the first exhaust conduit comprises increasing residence time of the liquid in the tank by diverting the liquid away from straight-line paths between the exhaust openings of the diffusers and the intake port of the first exhaust conduit.

59. The method of claim 58 further comprising venting accumulated gas and oil from a diverter configured to divert the liquid away from the straight-line paths.

\* \* \* \* \*